US 11,794,514 B2

(12) United States Patent
Tsiberidis

(10) Patent No.: US 11,794,514 B2
(45) Date of Patent: Oct. 24, 2023

(54) EMERGENCY WHEEL WITH MOUNTING ELEMENT

(71) Applicant: GV ENGINEERING GMBH, Heimsheim (DE)

(72) Inventor: Konstantin Tsiberidis, Untergruppenbach (DE)

(73) Assignee: GV ENGINEERING GMBH, Heimsheim (DE)

( * ) Notice: Subject to any disclaimer, the term of this patent is extended or adjusted under 35 U.S.C. 154(b) by 885 days.

(21) Appl. No.: 16/626,695

(22) PCT Filed: Jul. 5, 2018

(86) PCT No.: PCT/EP2018/068295
§ 371 (c)(1),
(2) Date: Dec. 26, 2019

(87) PCT Pub. No.: WO2019/008114
PCT Pub. Date: Jan. 10, 2019

(65) Prior Publication Data
US 2020/0223250 A1 Jul. 16, 2020

(30) Foreign Application Priority Data
Jul. 6, 2017 (DE) .......................... 102017115182.6

(51) Int. Cl.
 *B60B 11/10* (2006.01)
 *B60B 15/26* (2006.01)
(52) U.S. Cl.
 CPC ............ *B60B 11/10* (2013.01); *B60B 15/263* (2013.01); *B60B 2900/731* (2013.01)

(58) Field of Classification Search
 CPC ......... B60B 11/10; B60B 15/18; B60B 15/20; B60B 15/26; B60B 15/263
 See application file for complete search history.

(56) References Cited

U.S. PATENT DOCUMENTS

| 3,679,267 | A |   | 7/1972 | Zachmann |   |
| 3,770,323 | A | * | 11/1973 | Isaacson | ................. B60B 11/10 301/38.1 |
| 3,866,978 | A | * | 2/1975 | Fine | ....................... B60B 11/10 301/38.1 |
| 3,934,936 | A | * | 1/1976 | Fine | ....................... B60B 11/10 301/40.3 |
| 4,666,216 | A |   | 5/1987 | Smith |   |

(Continued)

FOREIGN PATENT DOCUMENTS

| BR | 102012026557 A2 | 7/2014 |
| CN | 103153643 A | 6/2013 |

(Continued)

OTHER PUBLICATIONS

PCT International Search Report and Written Opinion completed by the ISA/EP on Oct. 12, 2018 and issued in connection with PCT/EP2018/068295.

(Continued)

*Primary Examiner* — Jason R Bellinger
(74) *Attorney, Agent, or Firm* — Barnes & Thornburg LLP

(57) ABSTRACT

This disclosure relates to an attachment for a vehicle wheel which allows the vehicle to be driven with limited tire functions.

24 Claims, 35 Drawing Sheets

(56) References Cited

U.S. PATENT DOCUMENTS

| | | | | |
|---|---|---|---|---|
| 6,068,346 | A * | 5/2000 | Pender | B60B 11/10 |
| | | | | 301/40.3 |
| 9,404,522 | B2 * | 8/2016 | Zhou | B60B 29/003 |
| 2005/0161999 | A1 | 7/2005 | Augustee Lee | |
| 2009/0267404 | A1 | 10/2009 | Thompkins | |
| 2013/0169025 | A1 | 7/2013 | Granstrom | |
| 2020/0086683 | A1 * | 3/2020 | Tsiberidis | B60B 15/26 |
| 2020/0164682 | A1 * | 5/2020 | Tsiberidis | B60B 19/00 |
| 2020/0223252 | A1 * | 7/2020 | Tsiberidis | B60B 19/00 |
| 2020/0247181 | A1 * | 8/2020 | Tsiberidis | B60B 15/26 |
| 2021/0039432 | A1 * | 2/2021 | Tsiberidis | B60C 17/043 |
| 2021/0053391 | A1 * | 2/2021 | Tsiberidis | B60B 11/10 |
| 2022/0041011 | A1 * | 2/2022 | Tsiberidis | B60B 11/10 |

FOREIGN PATENT DOCUMENTS

| | | |
|---|---|---|
| EP | 0606946 A1 | 7/1994 |
| FR | 696883 A | 1/1931 |
| FR | 1043038 A | 11/1953 |
| TW | 348635 U | 12/1998 |
| TW | 257298 U | 2/2005 |

OTHER PUBLICATIONS

First Office Action dated Oct. 27, 2022 in counterpart Chinese Application No. CN201880054235A.
Examination Report in co-pending Chinese application CN201880054235A dated Apr. 19, 2023—11 pages.

* cited by examiner

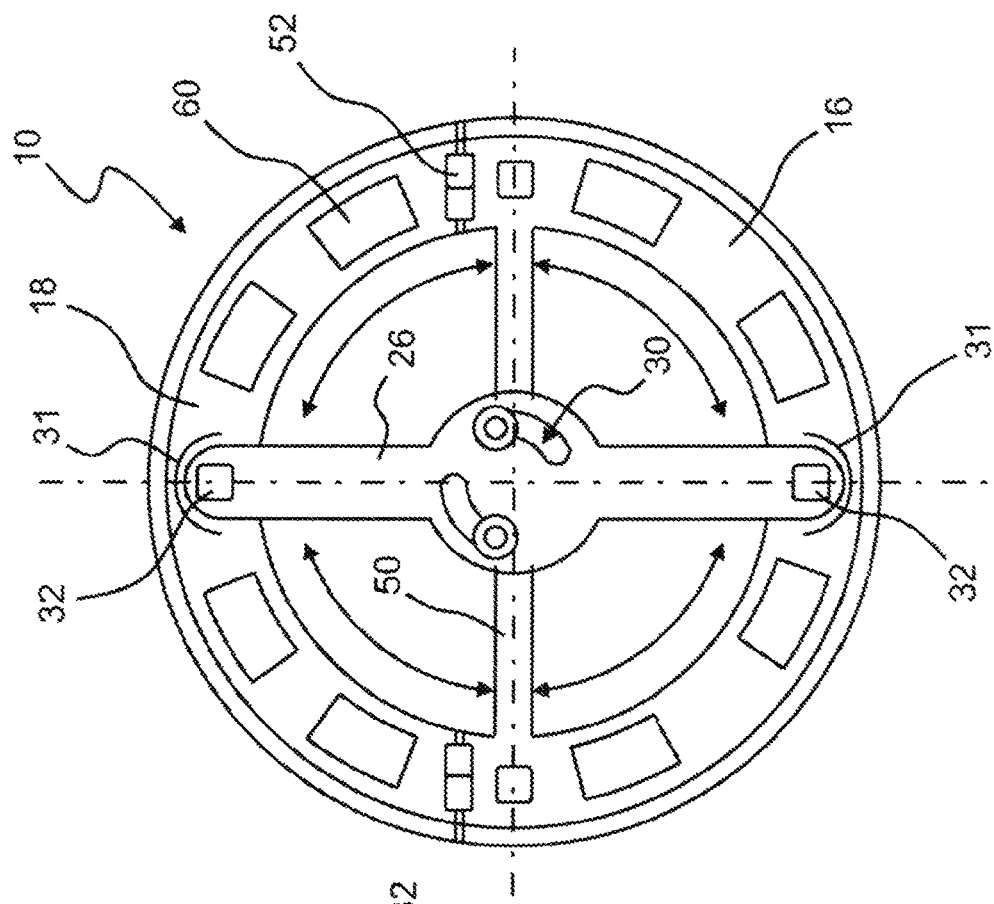
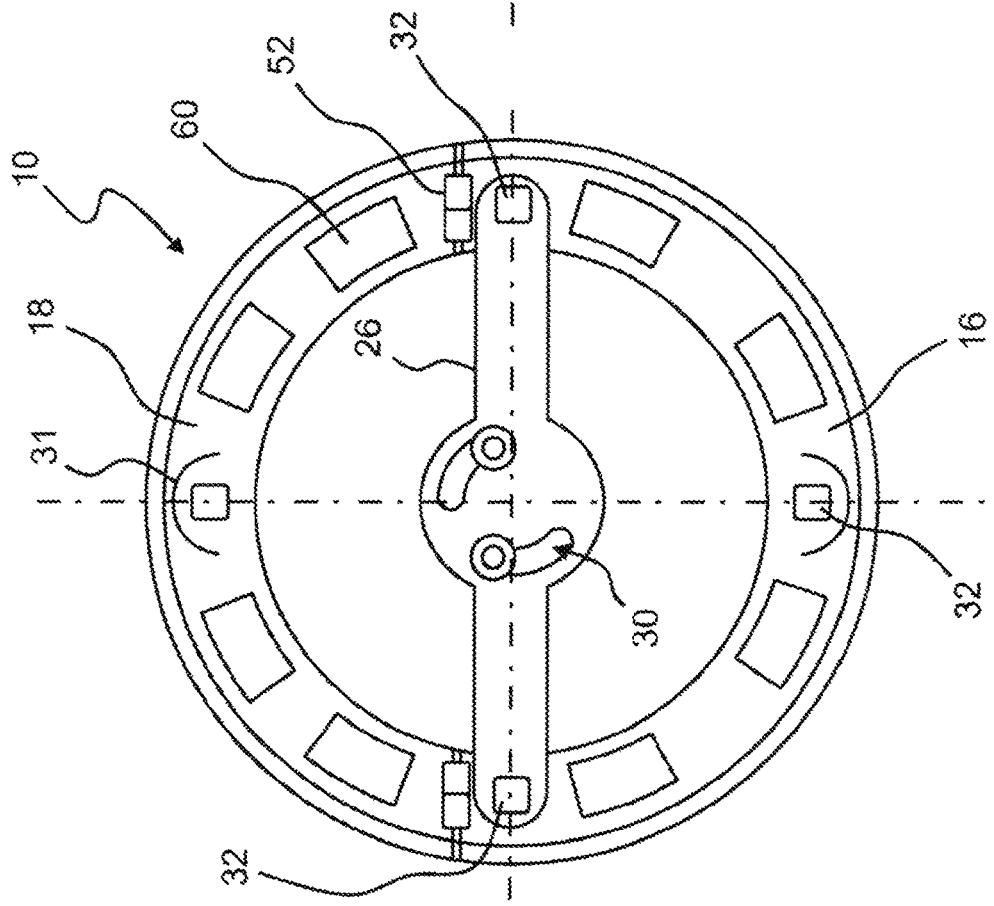

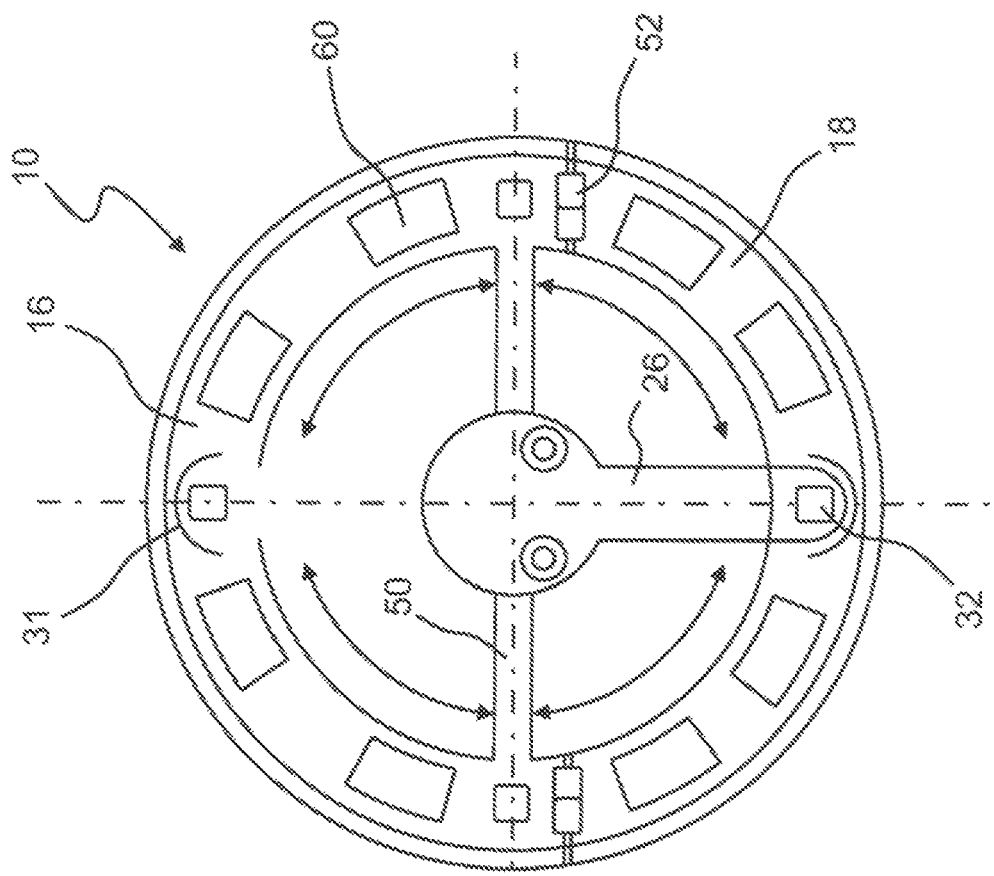
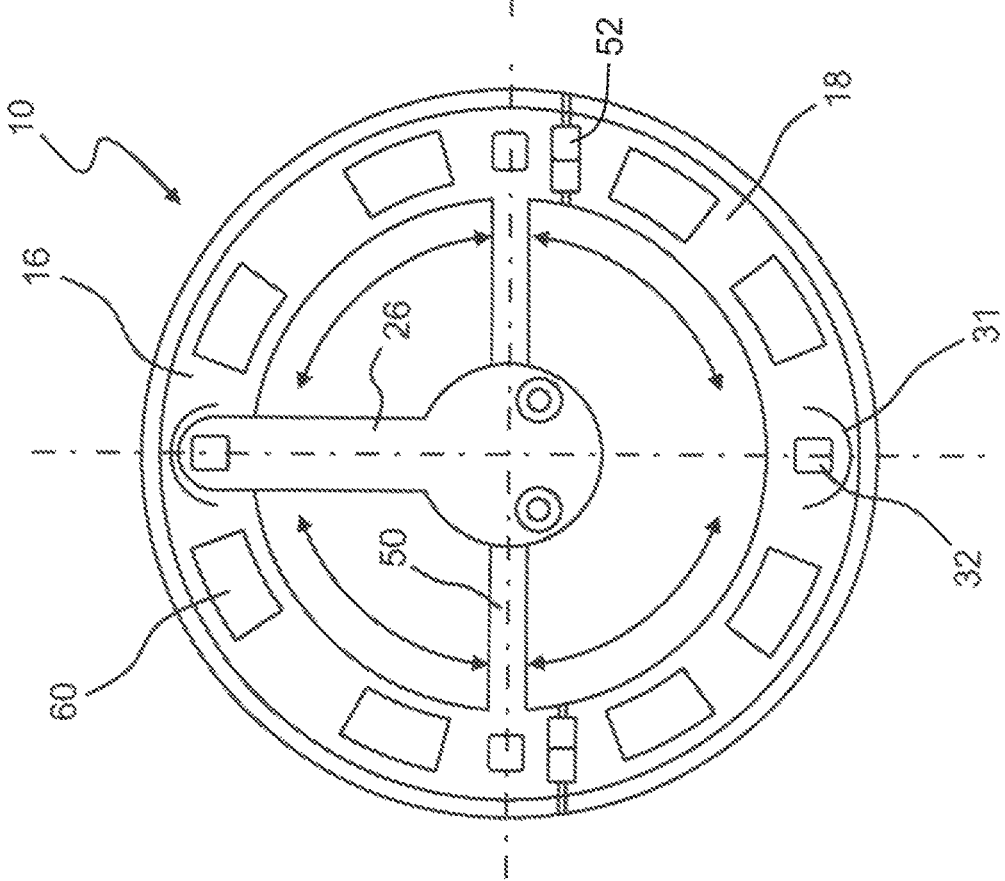
Fig. 9B
Fig. 9A

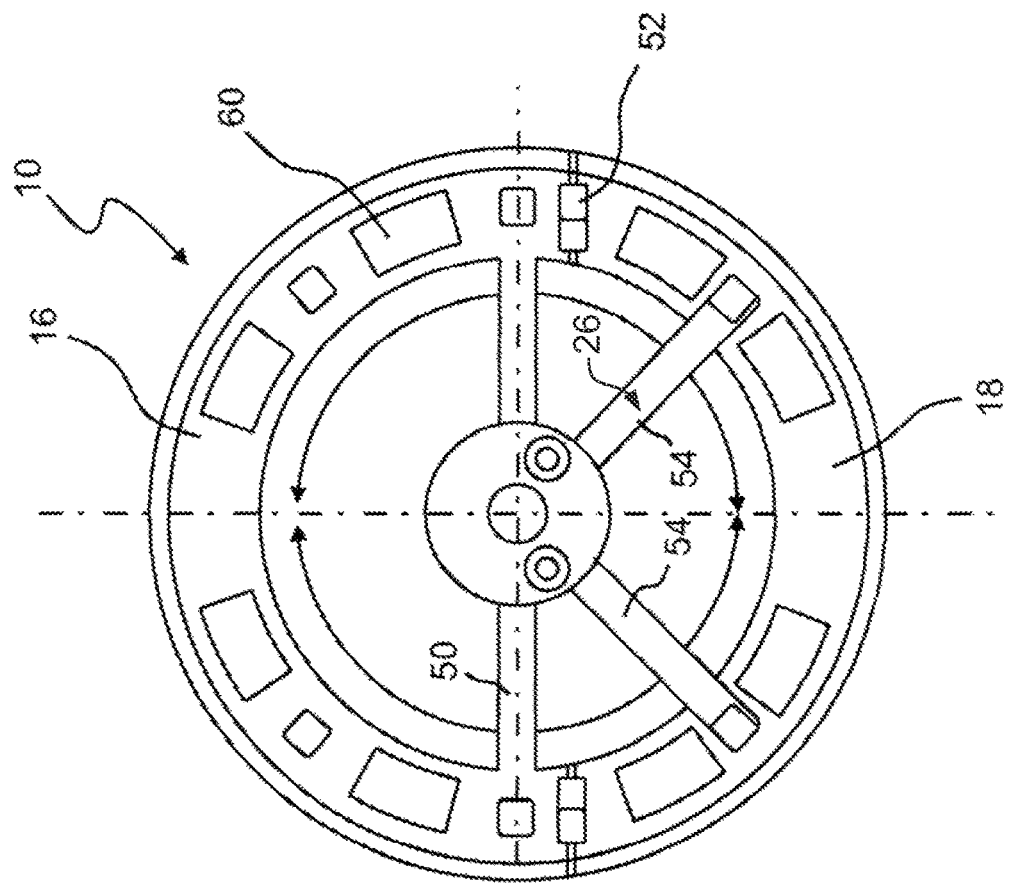
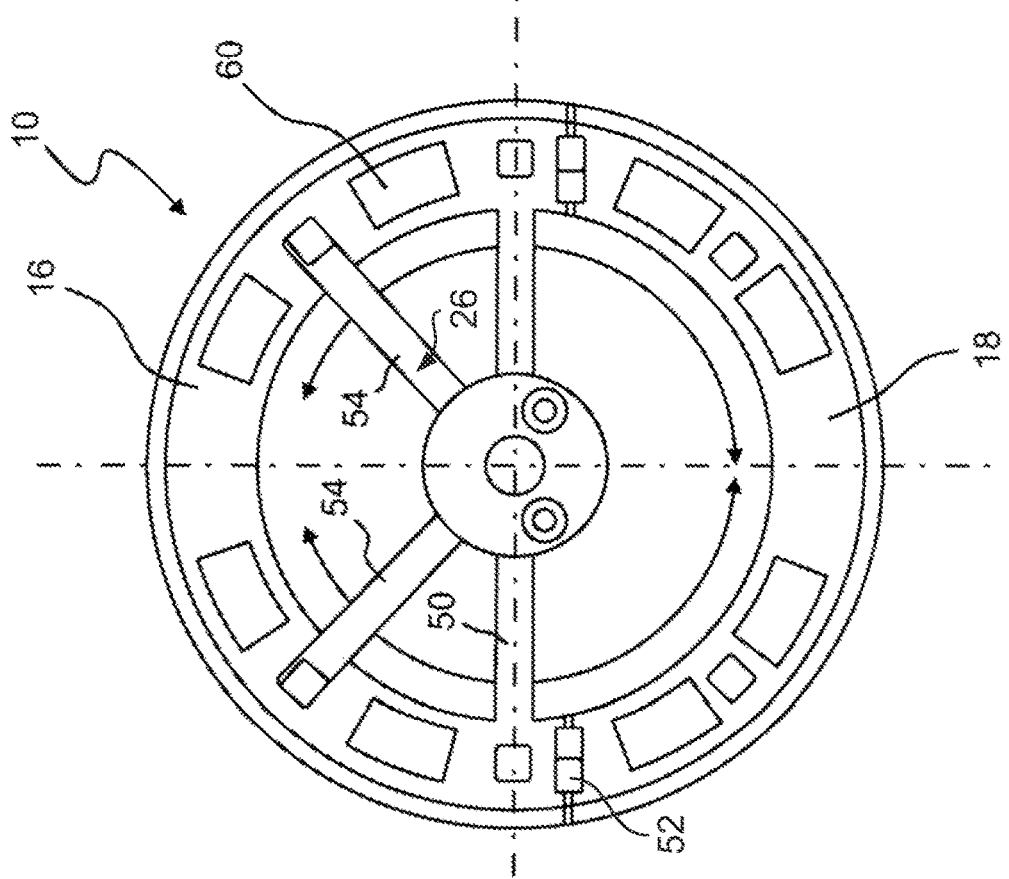
Fig. 10A
Fig. 10B

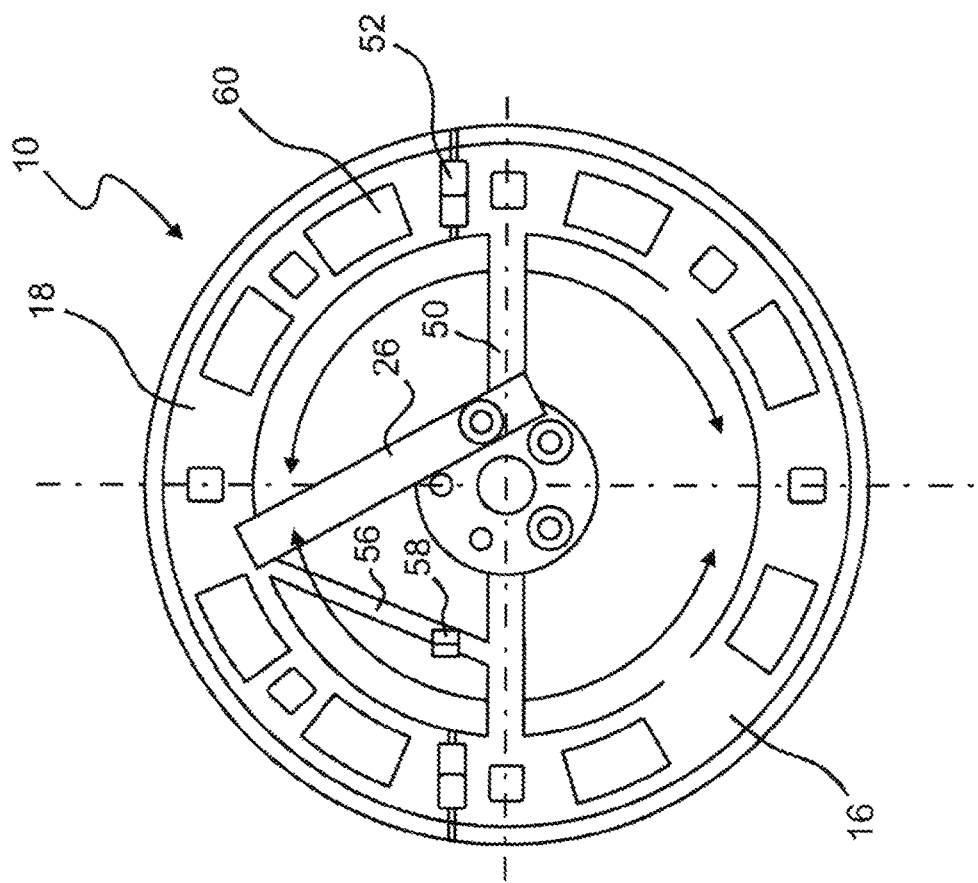
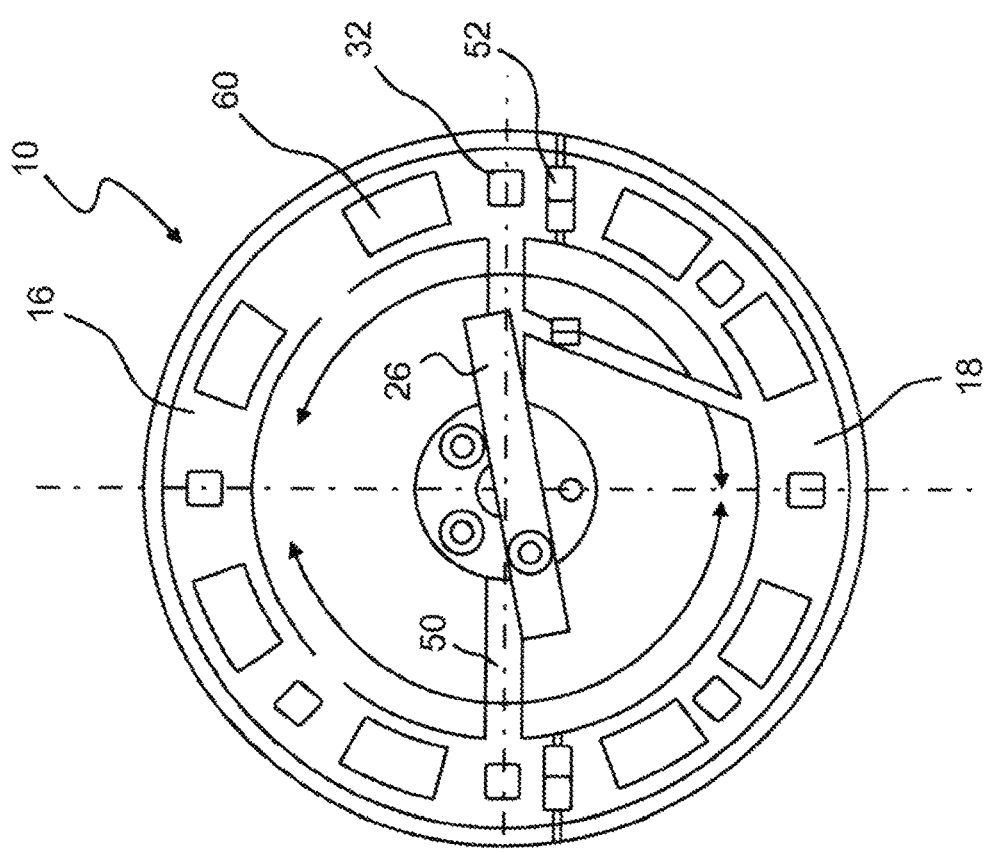
Fig. 11A
Fig. 11B

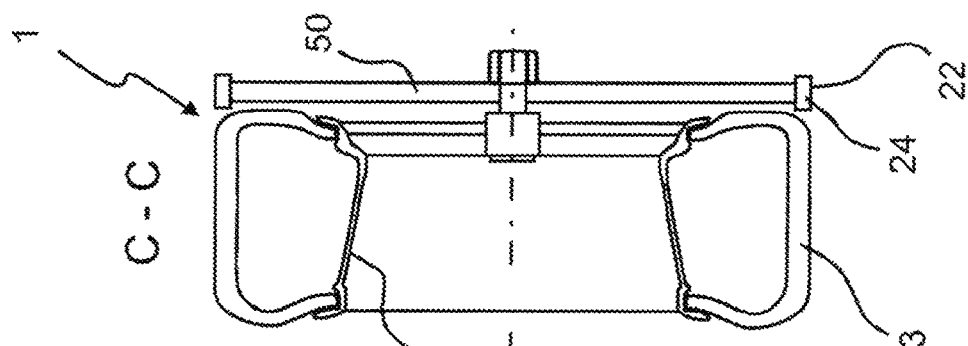
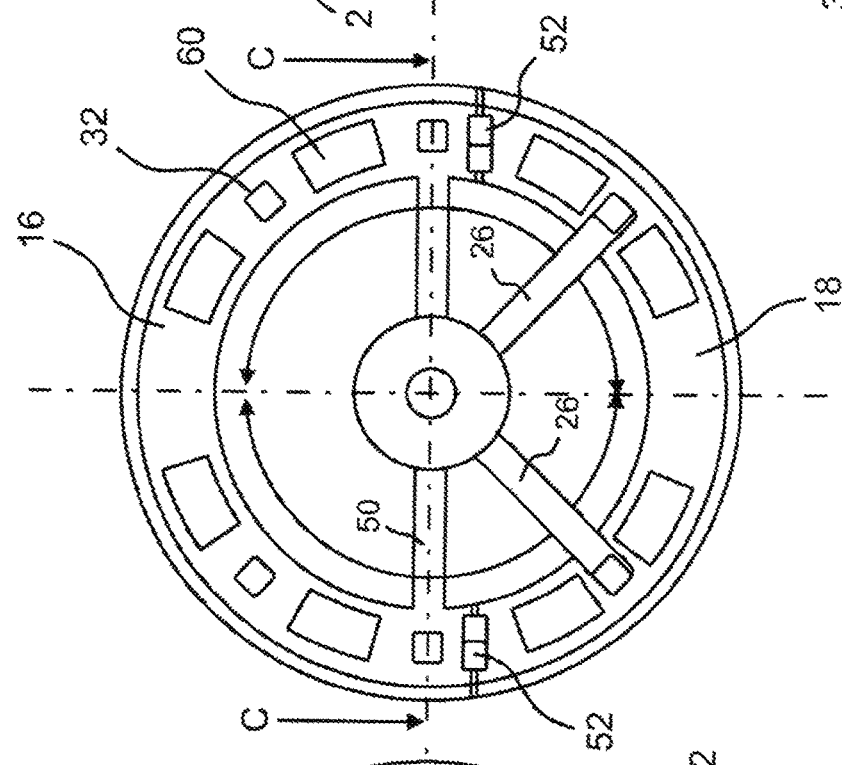
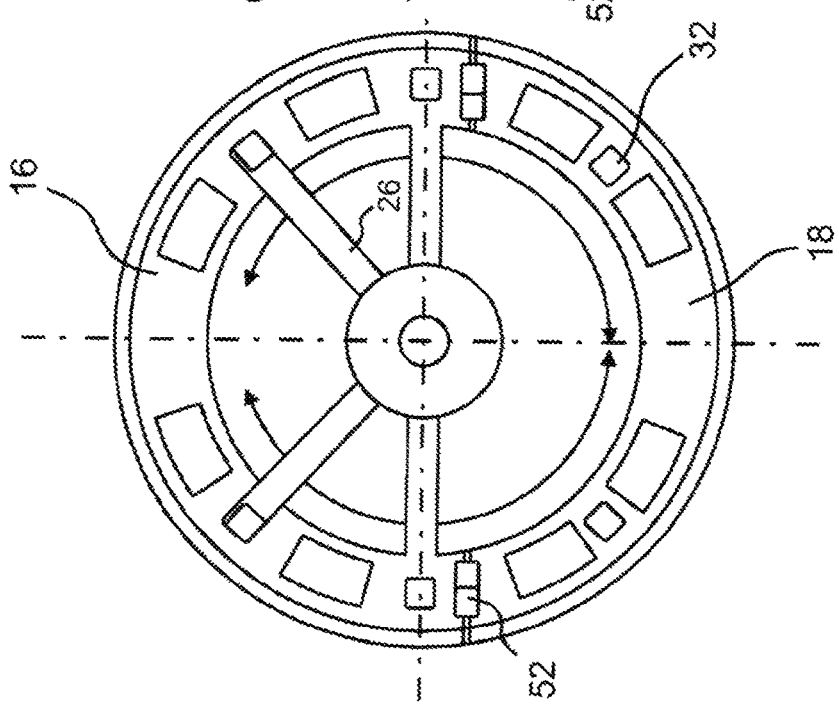
Fig. 16C
Fig. 16B
Fig. 16A

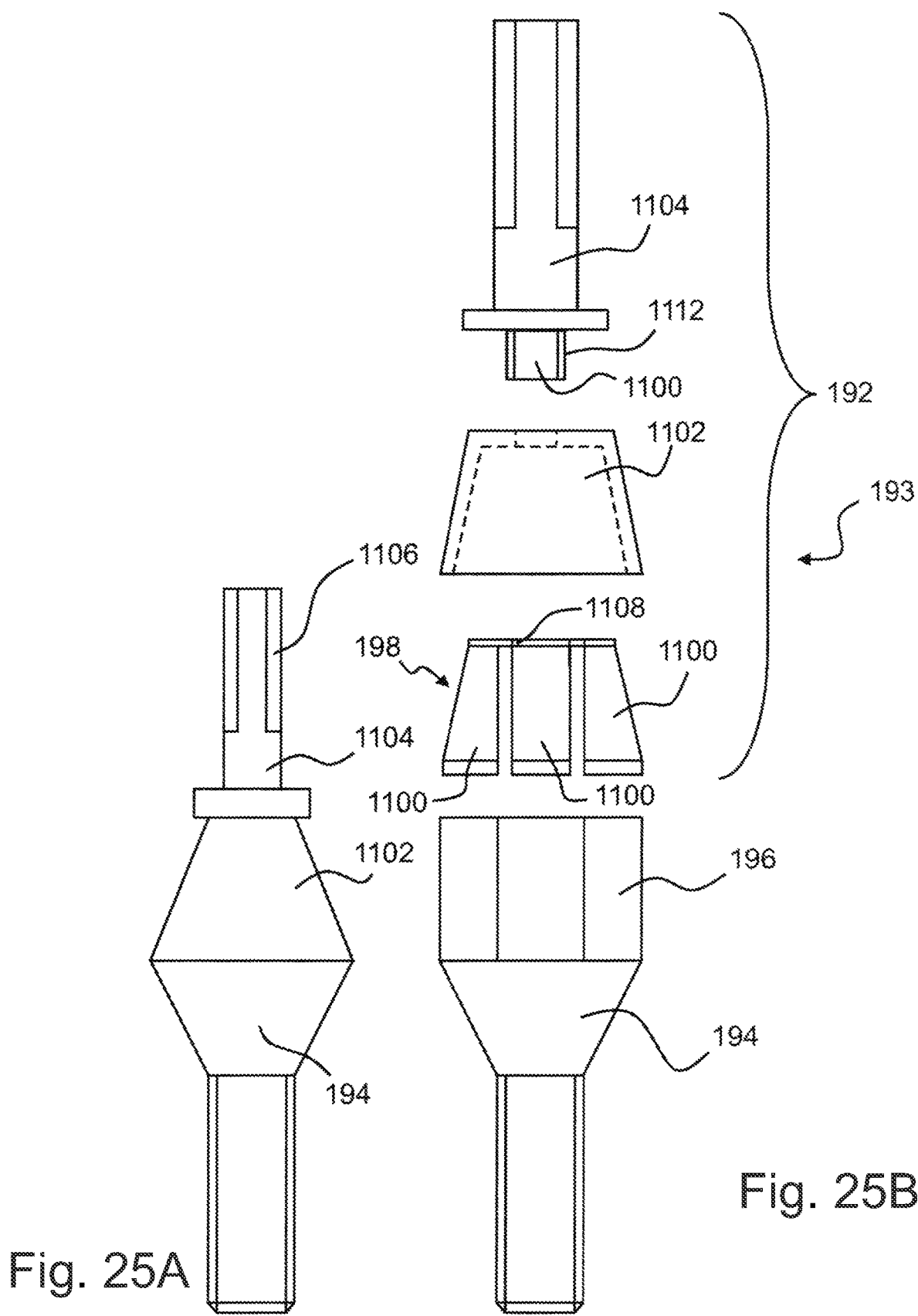

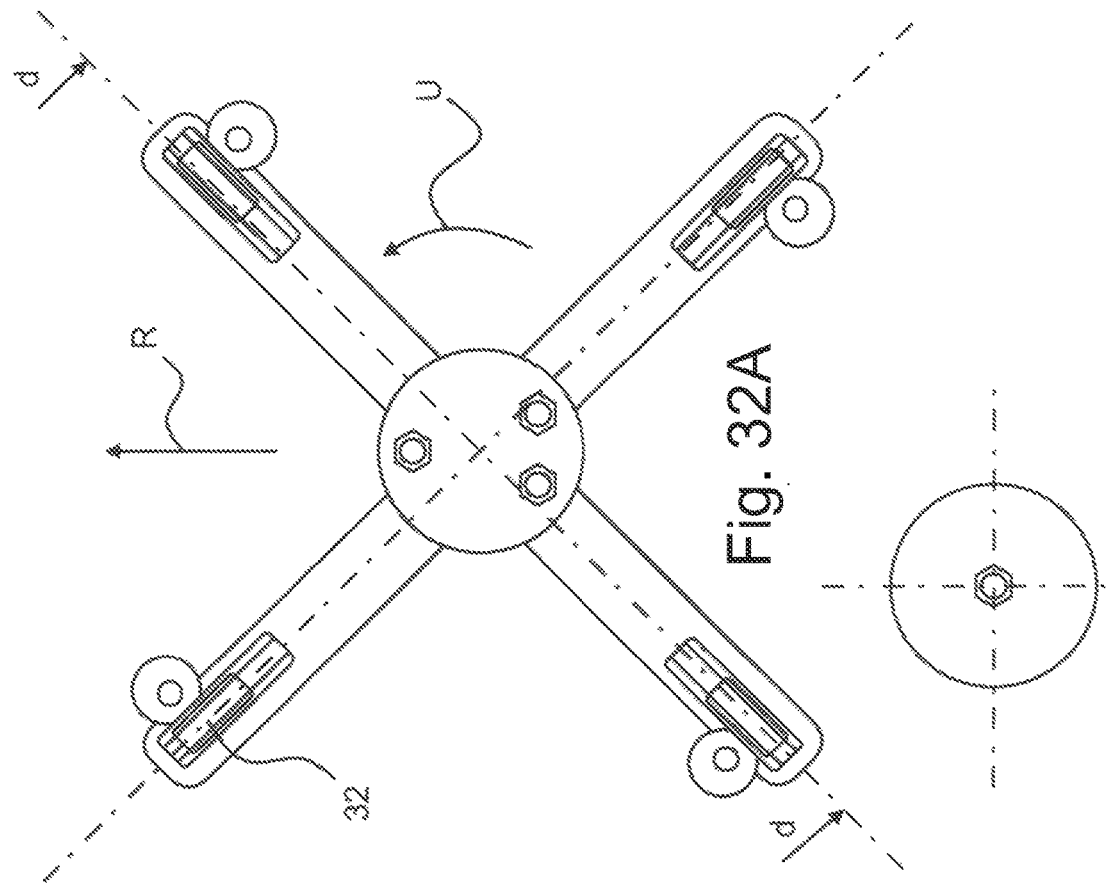

ically connected on one side via the attachment fastening screw to the vehicle wheel and on the other to the mounting element. The attachment fastening screw thereby not only assumes the function of the fastening of the first peripheral segment relative to the vehicle wheel but also fastening and bearing of the mounting element.

EMERGENCY WHEEL WITH MOUNTING ELEMENT

CROSS REFERENCE TO RELATED APPLICATIONS

This is a national stage entry of International Patent Application No. PCT/EP2018/068295, filed Jul. 5, 2018, which claims the benefit of and priority to German Patent Application No. 10 2017 115 182.6, filed Jul. 6, 2017, the disclosures of which are both expressly incorporated herein by reference in their entireties.

FIELD OF THE DISCLOSURE

The present invention relates to an attachment for a vehicle wheel for enabling driving operation with limited tire function.

BACKGROUND

A vehicle wheel means a vehicle wheel of a motor vehicle. Driving operation with limited tire function in the present case means driving operation in which the tire cannot be operated with the properties that it exhibits under usual road conditions and the usual tire condition. This can mean, for example, driving with a flat tire or also operation of the vehicle in icy or snowy conditions. The preferred field of application of the present invention is to enable driving with a flat tire.

SUMMARY

In the present case, axial direction means the direction of the axis of rotation of the vehicle wheel. The radial direction means the direction orthogonal to the axis of rotation of the vehicle wheel. The tire of the vehicle wheel is thus arranged radially outwards when seen from the rim of the vehicle wheel. A bolt circle of the wheel hub, or of the vehicle wheel, for example, is located radially inwards, the bolt circle of the vehicle wheel meaning in the present case the arrangement of the screw openings for introduction of the fastening screws into the wheel hub. The bolt circle conventionally also comprises a center opening. The peripheral direction means the direction along the periphery of the vehicle wheel, that is to say along its tread surface.

The object of the present invention is to provide an attachment for a vehicle wheel which can be mounted simply and securely, in particular in such a manner that the vehicle wheel does not have to be removed during mounting and the vehicle also does not have to be lifted during mounting, for example using a car jack.

This object is achieved by an attachment according to the invention.

Such an attachment according to the invention is configured with a base body, wherein the base body has an annular tread surface in an operating state of the attachment, wherein the base body comprises at least a first peripheral segment and a second peripheral segment, wherein the first peripheral segment is configured to be rigid in the peripheral direction and can be fastened to the vehicle wheel, preferably wherein the first peripheral segment comprises a fastening portion via which it can be fastened, preferably screwed, to a bolt circle of the vehicle wheel, and wherein the attachment comprises a mounting element which is fastened or can be fastened to the first peripheral segment in such a manner that it can be transferred into a mounting position or is in the mounting position, wherein the mounting element aligns the second peripheral segment relative to the first peripheral segment and urges it towards the rim of the vehicle wheel when the first peripheral segment is fastened to the vehicle wheel and the mounting element is in the mounting position.

In the case of the attachment according to the invention, the first peripheral segment can first be fastened to the vehicle wheel. Because the first peripheral segment does not extend around the whole of the periphery, or the entire periphery, of the vehicle wheel but the entire periphery also comprises at least the second peripheral segment, the first peripheral segment can be attached and fastened to the vehicle wheel in a simple manner without the vehicle wheel having to be removed or the vehicle having to be lifted. This fastening can take place, for example, via tension belts or other suitable fixing means. Preferably, however, fastening takes place via the fastening portion. This fastening portion is preferably so configured that it can be fastened to the bolt circle of the vehicle wheel. Preferably, the fastening portion can be screwed to the bolt circle of the vehicle wheel. For this purpose, the fastening portion can have a hole pattern which corresponds in part to the hole pattern of the bolt circle. This means that at least two screws which are introduced into the hole pattern of the bolt circle are so arranged that they are located, when seen in the axial direction, in the region of the holes of the hole pattern of the fastening portion. A standard fastening screw of the vehicle wheel can then first be removed in the course of mounting the attachment and replaced by an attachment fastening screw, which has an internal thread in its head. A further screw can then be screwed into the internal thread in the head of the attachment fastening screw, via which further screw the fastening portion of the attachment can be fastened to the vehicle wheel. It is thereby ensured that the fastening portion and thus also the first peripheral segment, which is connected to the fastening portion, are securely fixed against the rim of the vehicle wheel. It is also within the meaning of the present invention to attach the fastening portion in the region of the center hole, wherein the fastening portion is correspondingly configured. The first peripheral segment can then be fastened in a simple manner to the rim, or to the vehicle wheel, using further clamping means located radially further outwards. An advantageous example of such clamping means will be explained in greater detail hereinbelow. Following the steps just described, the second peripheral segment can be positioned at its intended location. In order to be able to securely fasten the second peripheral segment to the vehicle wheel or rim likewise using clamping means, it is necessary to align it in the intended position relative to the first peripheral segment and position it as close to the rim of the vehicle wheel as possible. This alignment and positioning takes place via the mounting element. The second peripheral segment is positioned loosely at the intended location and then aligned precisely relative to the first peripheral segment via the mounting element and urged in the direction towards the rim of the vehicle wheel. The second peripheral segment can then be fastened to the rim likewise via clamping means.

It is advantageous if the mounting element is pivotable or displaceable relative to the first peripheral segment. The mounting element can thereby be transferred in a simple manner from a position in which it is located when the first peripheral segment is fastened to the vehicle wheel into the mounting position.

It is also preferred if the mounting element is fastened relative to the vehicle wheel, or vehicle rim, via an attachment fastening screw as has been described above, that is to say an attachment fastening screw which has an internal thread in its head. For example, the mounting element can then have slots by which the screw of that type is guided. The slots can be curved or straight, depending on whether the mounting element is to be configured to be pivotable or displaceable. Advantageously, the mounting element also has a hole pattern which in any case corresponds to at least a portion of the hole pattern of the bolt circle of the vehicle wheel. This means that at least two screws which are introduced into the hole pattern of the bolt circle are so arranged that, when seen in the axial direction, they are located in the region of the holes of the hole pattern of the mounting element. It is also within the meaning of the invention to attach the mounting element in the region of the center hole.

It is also preferred if the attachment comprises a device for gripping a wheel bolt by clamping and/or engaging behind it, and if the mounting element and/or a fastening portion can be fastened to the vehicle wheel via the device for gripping a preferably conventional wheel bolt by clamping and/or engaging behind it.

It is also preferred if the mounting element is detachable from the first peripheral segment. The attachment is thus flexibly stowable. For mounting the attachment on the vehicle wheel, the mounting element can then, for example, be connected directly to the first peripheral segment. Such a connection can be made, for example, via screws or a latching mechanism or by any other means. The mounting element can, however, also be connected indirectly to the first peripheral segment, for example via the above-mentioned screws which are screwed into the bolt circle of the vehicle wheel or into attachment fastening screws having an internal thread in the head which are located there. Although the mounting element is then connected or fastened to the first peripheral segment, it is not fastened thereto directly via the screws.

It is additionally advantageous if there are arranged on the first peripheral segment and/or on the second peripheral segment securing devices for the mounting element, in order to fix the position thereof, preferably in the peripheral direction, relative to the first peripheral segment, or the second peripheral segment. Securing devices mean, for example, devices which, in the case of a peripherally pivotable mounting element, prevent lateral pivoting from the securing device. Such a securing device can be in the form of, for example, elevations which are arranged laterally of an intended position for the mounting element. If the mounting element is mounted on the attachment in the axial direction, the mounting element is located in the securing device and can no longer be pivoted laterally. In order to pivot the mounting element laterally, its fixing can be loosened and the mounting element can be lifted in the axial direction and pivoted out of the securing device. A securing device can, however, also be configured to suppress a displacement of the mounting element. For this purpose, the mounting element can have a recess, for example, into which a projection on the first or second peripheral segment can engage. These securing devices thus specify, as it were, preferred positions for the mounting element relative to the first or second peripheral segment. Preferably, these securing devices are arranged in the region of clamping means, which will be discussed in greater detail hereinbelow with reference to an exemplary embodiment. The mounting element is then arranged in an intended position in the region of these clamping means, so that the clamping means can advantageously be used for final fastening of the attachment to the vehicle wheel.

Fastening via the center opening is possible in principle for the fastening portion and for the mounting element via an engagement element. The engagement element can be capable of being connected directly, for example, that is to say without a clamping screw, to the fastening portion and also to the mounting element. However, an embodiment is also conceivable in which the engagement element can be connected to the fastening portion or the mounting element via a clamping screw. The engagement element can be configured to engage behind a portion of the center opening in a form-fitting manner. Such a form-fitting engagement can be formed, for example, via resiliently pivotable or bendable fingers. Also conceivable, however, is an embodiment in which an engagement portion is expandable, for example by means of a grub screw, and can thereby be clamped in the center opening.

It is advantageous if the attachment comprises an engagement element which is configured to fasten the fastening portion and/or the mounting element to the center opening directly or indirectly, preferably via a clamping element, in particular via a clamping screw, preferably wherein the engagement element comprises an engagement portion which is configured to engage behind a portion, preferably a groove, of the center opening in a form-fitting manner, preferably wherein the engagement portion is mechanically expandable or resiliently pivotable.

A clamping screw represents a possible embodiment of a clamping element with which the fastening portion and/or the mounting element can be clamped against the engagement element. In general, a clamping element means an element with which the mounting element or the fastening portion can be pulled or clamped or is capable of being clamped against the engagement element.

In an advantageous embodiment it is provided that the mounting element and/or the fastening portion comprises or comprise a hole pattern which corresponds in any case to a portion of the hole pattern of the bolt circle of the vehicle wheel. This facilitates the fastening of the mounting element or of the fastening portion to the bolt circle using the above-described attachment fastening screws with an internal thread in the head.

It is additionally advantageous if the first peripheral segment comprises an arcuate portion, preferably wherein the arcuate portion has a peripheral extent of more than 180°, preferably of more than 190°, in particular of more than 195°, preferably wherein a fastening portion which may be present extends in the manner of a chord over the region of the bolt circle of the vehicle wheel. The attachment, or the first peripheral segment of the attachment, thereby acquires particularly high mechanical stability while at the same time being of low weight. If the above-described fastening portion is thereby provided, the stability is increased further and the attachment can be attached to the vehicle wheel in a particularly simple manner, wherein the weight of the attachment remains low.

It is preferred if the second peripheral segment has a peripheral extent of at least 45°, preferably at least 60°, preferably at least 90°, in particular at least 120°, in particular at least 150°.

It is preferred if the first peripheral segment has a peripheral extent of more than 180°, preferably of more than 190°, in particular of more than 195°.

It is also advantageous if the mounting element is V-shaped, wherein two legs of the mounting element extend in the mounting position at least from the bolt circle to the second peripheral segment, or that the mounting element is in the form of a rod, wherein it extends in the mounting position at least from the bolt circle to the second peripheral segment, preferably wherein it extends from the first peripheral segment over the bolt circle to the second peripheral segment. It is also conceivable that two such rod-like mounting elements are provided. Such mounting elements can be configured to be variably movable relative to one another or connected together rigidly in an X-shape.

It is also advantageous if the second peripheral segment is pivotably fastened to the first peripheral segment via a hinge device, preferably via two hinge devices. For transporting the attachment, the second peripheral segment can then be folded onto the first peripheral segment. On mounting of the attachment, this folded configuration can initially be retained. When the first peripheral segment has been fastened to the vehicle wheel, the second peripheral segment can be folded out so that a closed circular-disk or annular shape of the attachment is produced. The precise alignment of the second peripheral segment can then be fixed via the mounting element relative to the first peripheral segment, the above-mentioned hinge devices accordingly do not have to be configured excessively precisely and in particular do not have to have a locking mechanism. It is preferred in particular if the first peripheral segment comprises the arcuate portion already described above and at the ends of which in each case one of the hinge devices is arranged, wherein it is particularly preferred if this arcuate portion has a peripheral extent of more than 180° and the second peripheral segment is configured to be complementary to the arcuate portion. If the second peripheral segment is then folded out as intended, a circular contour of the attachment is obtained as a result of the two mutually complementary peripheral segments.

It is also advantageous if at least one clamping means, preferably a plurality of clamping means, having a hook portion is or are arranged on the first peripheral segment and/or on the second peripheral segment, wherein the hook portion is configured to engage behind a portion, in particular a rim flange, of the rim of the vehicle wheel in an operating state of the attachment. The operating state of the attachment means a state in which the attachment is attached to the vehicle wheel in its desired final configuration, in the state in which it is to be used for driving the vehicle. Advantageously, such clamping means are arranged radially outwards from the bolt circle of the rim in the operating state of the attachment. The clamping means have the advantage that the attachment is fastened particularly securely to the vehicle wheel. In particular clamping means that engage behind the rim flange advantageously secure the attachment against deforming, because they establish secure contact with the rim of the vehicle wheel close to the tread surface of the attachment or of the vehicle wheel.

It is also advantageous if the clamping means are pivotable and/or displaceable in the radial direction and/or in the axial direction relative to the peripheral segments, preferably wherein the attachment comprises a coupling mechanism which couples a movement of at least two clamping means on actuation of one of the clamping means coupled via the coupling mechanism in the radial direction and/or in the axial direction, preferably wherein the coupling mechanism is so configured that the movement of the coupled movable clamping means is uniform. Owing to the movability of the clamping means, engagement behind the rim or the rim flange can be implemented in a simple manner. In particular a coupled movement of the clamping means allows the attachment to be fastened to the vehicle wheel in a particularly simple manner and additionally has a self-centering effect on the attachment.

It is also advantageous if the clamping means comprise a clamping surface which, when seen in the axial direction, slopes radially inwards, preferably in a linear or curved manner, wherein the clamping means are so configured that the clamping surface moves, in particular is displaced, radially inwards on fastening and clamping of the attachment to the rim, and the clamping surface is so configured that the attachment is urged in the axial direction towards the rim on fastening and clamping to the rim of the vehicle wheel. Particularly close contact of the attachment with the rim, preferably with the attachment lying against the rim, is thereby achieved, which has an advantageous effect on the stability of the fastening of the attachment.

In the region in which the attachment is in contact with the rim it can advantageously comprise a resilient damping means, in order to prevent damage to the rim.

It is also advantageous if the clamping means comprise flexible, resilient coatings in the region of their hook portion or their clamping surface, for preventing damage to the rim, in particular the rim flange.

The base body is preferably produced using steel. Other materials are, however, also conceivable.

The clamping means can be configured to be detachable from the base body. For this purpose, the clamping means can be fastened or capable of being detachably fastened, for example, to a holding lug. Such a detachable fastening can be achieved, for example, via a screw connection. Preferably, the clamping means move or pivot radially inwards when such a screw connection is tightened.

Advantageously, the hook portion of the clamping means is configured to be curved in the peripheral direction, in order to lie flat against the rim, in particular the rim flange.

Optionally, the attachment comprises a clamping mechanism having a contact portion which is configured to actuate the clamping means and bring the hook portion into engagement behind the portion of the rim, preferably the rim flange, when the contact portion is actuated, in particular subjected to pressure. By means of the clamping mechanism with the contact portion it is possible that the clamping means are always guided securely and in a reproducible manner into engagement behind the portion of the rim, or the rim flange. Engagement of the clamping means takes place, as it were, automatically and thus always reproducibly. The attachment according to the invention is for this purpose first attached to the vehicle wheel. Final fastening, in a manner that is secure for driving operation, takes place by the engagement of the clamping means behind the portion of the rim, or the rim flange. Engagement behind the portion of the rim, or the rim flange, takes place, as it were, automatically. For example, the contact portion can be so configured and arranged that this engagement comes about when the vehicle wheel is first turned. For this purpose, the contact portion is so configured and arranged, for example, that it protrudes beyond the tread surface of the attachment so that, when the vehicle wheel comes into contact with the contact portion with the road surface when it first turns, it is thereby actuated and the contact portion is pressed into the attachment through contact with the road surface and this force is transmitted to the clamping means, whereby the clamping means is actuated and thereby moved towards the rim, in particular the rim flange. During this movement of the clamping means towards the rim or the rim flange, the hook portion is brought into engagement behind the portion of the rim, or the rim flange. The contact portion can also be arranged on the side of the attachment that faces towards the rim. If the attachment is then clamped against the rim, for example via a tension belt or the fastening portion, the contact portion is actuated and thus the clamping means is actuated, so that it comes into engagement behind the rim, in particular the rim flange.

Optionally, the clamping mechanism is configured to contact a road surface with the contact portion, when the attachment is provisionally attached to the vehicle wheel and the vehicle wheel is turning, and thereby to actuate the contact portion, in particular to subject it to pressure, preferably wherein the contact portion is arranged spatially, in particular when seen in the axial direction, in the tread surface of the attachment and preferably wherein the contact portion, in a deployed state, extends in the peripheral direction flush with the tread surface of the attachment. The contact portion can thereby be actuated in a simple manner during driving operation during the first turn of the vehicle wheel.

Optionally, the clamping mechanism is configured to contact the rim with the contact portion when the attachment is attached to the vehicle wheel, and thereby to actuate the contact portion, in particular subject it to pressure, preferably wherein the contact portion is arranged on the side of the attachment that faces towards the rim.

The clamping means are thereby moved, as it were, automatically into engagement when the attachment is clamped against the vehicle wheel.

Optionally, the clamping mechanism comprises a ratchet device, wherein the ratchet device is configured to allow the contact portion to move freely when the hook portion is in engagement behind the portion of the rim, in particular the rim flange. Damage to the rim is thereby reliably prevented.

Optionally, the clamping means is coupled to the clamping mechanism via a pressure limiting device which limits a pressure with which the clamping means is urged towards the rim and/or with which the clamping means contacts the rim to a limit pressure. Damaging contact of the rim with excessive pressure is thereby reliably avoided.

Optionally, the clamping mechanism comprises a holding mechanism which is configured to hold the clamping means in its position when the clamping means is in engagement with its hook portion behind the portion of the rim, preferably the rim flange. Unintentional detachment of the clamping means is thereby prevented.

The attachment advantageously comprises a positioning device for the centered positioning of the attachment on the rim of the vehicle wheel, wherein the positioning device can be actuated independently of the clamping means. The positioning device is preferably so configured that the attachment can be clipped onto the rim of the vehicle wheel. Via the device, the attachment can be attached loosely to the vehicle wheel in a centered manner. It can then be fastened to the vehicle wheel, for example via the fastening portion. The first peripheral segment can then be fixedly clamped to the vehicle wheel in its final position by means of the clamping means. The second peripheral segment can then be folded into its final configuration. By means of the mounting element, the second peripheral segment can then be securely aligned relative to the first peripheral segment and urged towards the vehicle wheel. Final fastening of the second peripheral segment can then take place likewise via clamping means which are optionally present.

Optionally, the attachment comprises an engagement element which is configured to fasten the fastening portion and/or the mounting element to the center opening directly or indirectly, preferably via a clamping element, in particular via a clamping screw, preferably wherein the engagement element comprises an engagement portion which is configured to engage in a form-fitting manner behind a portion, preferably a groove, of the center opening, preferably wherein the engagement portion is mechanically expandable or resiliently pivotable. The attachment can thereby be fastened in a simple manner to the vehicle wheel. Preference is given to a combination of this form with the above-mentioned clamping means, in particular with the clamping means which can be actuated via the clamping mechanism having the contact portion.

Optionally, the fastening portion comprises a device for gripping a conventional wheel bolt by clamping and/or engaging behind it, preferably wherein the device comprises a clamping cap having at least two clamping arms and comprises a clamping sleeve which, when it is pushed onto the clamping cap, biases the clamping arms towards one another in such a manner that a head of a wheel bolt can be gripped by the clamping arms, and comprises a bolt with which the clamping sleeve can be clamped against the clamping cap. The attachment can thereby be fastened in a simple manner to the vehicle wheel. Preference is given to a combination of this embodiment with the above-mentioned clamping means, in particular with the clamping means which can be actuated via the clamping mechanism having the contact portion.

The present invention also provides an attachment for a vehicle wheel for enabling driving operation with limited tire function, wherein the attachment can preferably be configured according to one or more of the embodiments described hitherto, wherein the attachment comprises a base body, and wherein the base body comprises a first radial element and a second radial element, wherein the first radial element is configured to be fastened to the vehicle wheel, and wherein the second radial element is configured to be fastened to the first radial element in an operating position, and wherein the second radial element extends in a portion of the periphery of the attachment in the radial direction beyond the first radial element when it is fastened to the first radial element in the operating position, preferably wherein the portion of the periphery comprises at least ⅛, in particular at least ¼, in particular at least ½, of the entire periphery, preferably the whole of the periphery, of the attachment. Such an attachment is thus, as it were, of multi-part construction in the radial direction. Such an attachment has the advantage that the first radial element can be fastened in a simple manner to the vehicle wheel, or to the rim of the vehicle wheel, and in a further step, the second radial element can be fastened to the already fastened first radial element.

In the attachment just described (which is multi-part in the radial direction) there is or are optionally arranged on the first radial element at least one clamping means, preferably a plurality of clamping means, having a hook portion, wherein the hook portion is configured to engage behind a portion, in particular a rim flange, of the rim of the vehicle wheel. The clamping means can be configured as described above. Via the clamping means, the first radial element can advantageously preferably be fastened to the rim flange.

Optionally, the clamping means comprise a clamping surface which, when seen in the axial direction, slopes radially inwards, preferably in a linear or curved manner, wherein the clamping means are so configured that the clamping surface moves, in particular is displaced, radially inwards on fastening and clamping of the first radial element to the rim, and the clamping surface is so configured that the first radial element is urged in the axial direction towards the rim on fastening and clamping to the rim of the vehicle wheel. Thereby Optionally, the first radial element and/or the second radial element comprise a plurality of parts which are detachable from one another and/or movable, preferably pivotable, relative one another. The attachment, or the individual radial elements, can thereby be disassembled or assembled in a compact manner, so that the attachment as a whole can be stowed in a simple manner.

Optionally, the second radial element comprises a tread surface of the attachment for contacting the road surface completely.

The clamping means are preferably arranged on the first radial element to be displaceable in the radial direction. The first radial element can thus be adjusted to different sizes of rims. Optionally, the clamping means are biased to a radially outermost position.

There is preferably provided on the first radial element an actuating device via which the clamping means can be so actuated that they engage behind the rim flange of the rim, in particular are moved or pivoted radially inwards so that they engage behind the rim flange.

The actuating device advantageously comprises a cable-pull device which preferably comprises a drum device for winding the cable, wherein preferably all the clamping means are coupled together via the cable-pull device and the clamping means are thereby movable, preferably uniformly.

It is also preferred if the first radial element can be fastened to the rim in the region of the bolt circle via a screw connection. It is preferred if, in addition, the above-mentioned clamping means are provided on the first radial element.

The clamping means arranged on the first radial element can also be movable or pivotable via a lifting device.

The mounting of the attachment which is in multi-part form in the radial direction will be outlined briefly hereinbelow. First of all, the first radial element is screwed on in the region of the bolt circle. For this purpose, one of the original wheel bolts, for example, can be replaced by one or more special screw(s), which is lengthened and equipped with a thread facing towards the attachment. By screwing a corresponding nut onto the thread facing the attachment, the attachment can thus be attached to the vehicle wheel. The clamping means can then be brought into engagement behind the rim flange. It is also possible that the first radial element is so configured that it is fastened to the rim flange only by means of the clamping means. After the first radial element has been fastened to the vehicle wheel, the second radial element can be fastened to the first radial element. Preferably, the two radial elements have for this purpose correspondingly configured screwing devices. It is preferred if the second radial element is in multi-part form. For example, a first part of the second radial element can be fastened to the first radial element on a side that is remote from the road surface. The vehicle wheel can then be so turned that the part of the second radial element that has already been fastened to the first radial element comes into contact with the road surface, and then the further part or the further parts of the second radial element can be fastened to the first radial element without the road surface being in the way.

BRIEF DESCRIPTION OF THE DRAWINGS

Further features, possible applications and advantages of the invention will become apparent from the following description of exemplary embodiments of the invention, which are explained with reference to the drawing, wherein the features can be fundamental to the invention both on their own and in different combinations, without explicit reference again being made thereto. In the drawing:

FIG. 8 includes FIG. 8A and FIG. 8B, and shows a further embodiment of an attachment according to the invention in a schematic representation;

FIG. 9 includes FIG. 9A and FIG. 9B, and shows a further embodiment of an attachment according to the invention in a schematic representation;

FIG. 10 includes FIG. 10A and FIG. 10B, and shows a further embodiment of an attachment according to the invention in a schematic representation;

FIG. 11 includes FIG. 11A and FIG. 11B, and shows a further embodiment of an attachment according to the invention in a schematic representation;

FIG. 16 includes FIG. 16A, 16B and FIG. 16C, and shows an attachment of similar construction to the attachment of FIG. 10;

FIG. 25 includes FIG. 25A and FIG. 25B, and shows a device for gripping a conventional wheel bolt by clamping;

FIG. 32 includes FIGS. 32A through 32E, and shows a first radial element of the attachment of FIG. 31, or portions of the first radial element;

DETAILED DESCRIPTION OF THE DRAWINGS

In the following figures, corresponding components and elements bear the same reference signs. For the sake of better clarity, not all reference signs are reproduced in all the figures.

Figure 1:
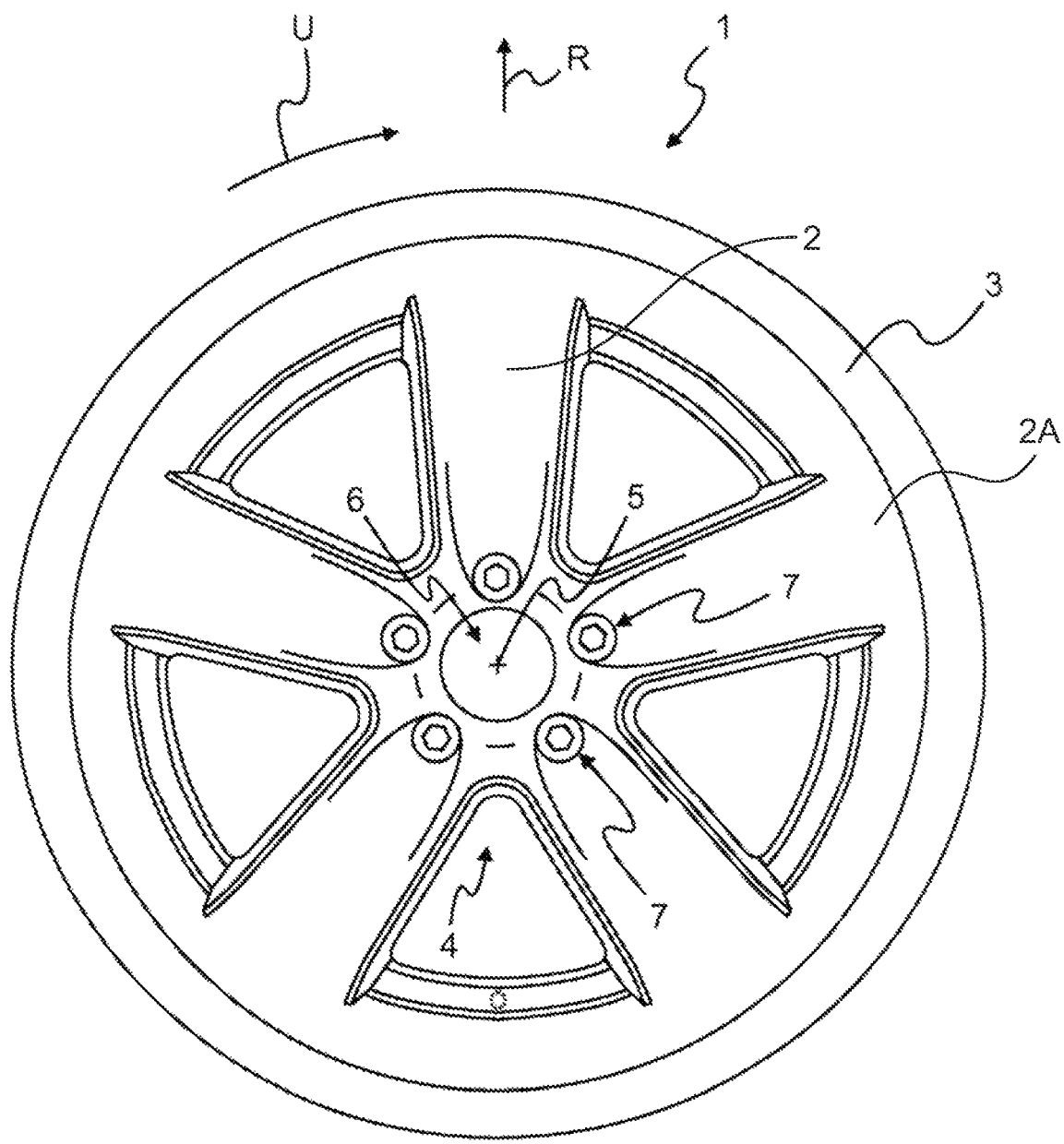
FIG. 1 shows a vehicle wheel, looking in an axial direction.
Figure 2:
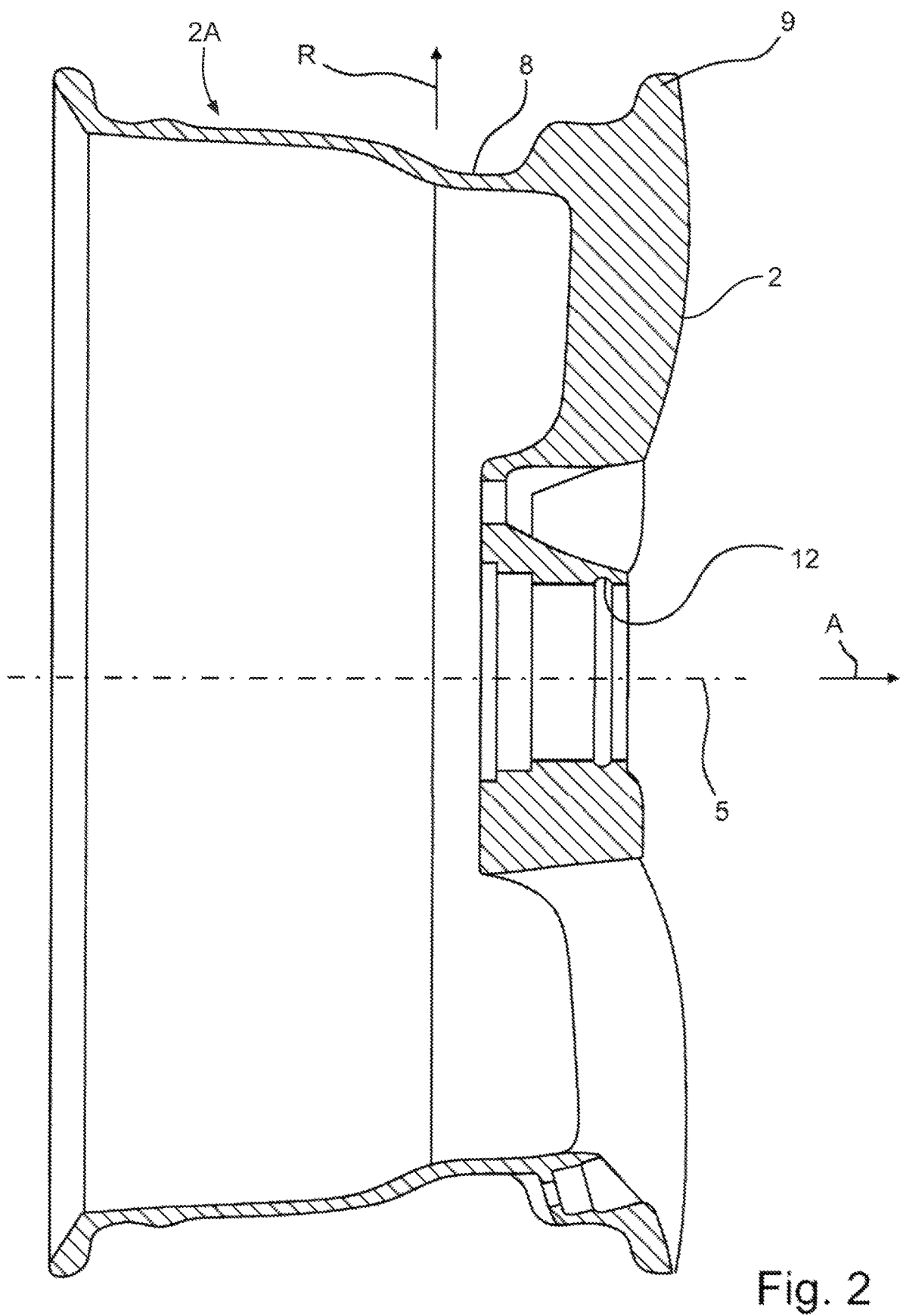
FIG. 2 is a sectional representation of the rim of the vehicle wheel of FIG. 1.

FIG. 1 shows, in a schematic representation, a vehicle wheel 1. The vehicle wheel 1 comprises a wheel disk 2 coupled to a rim 2A and a tire 3 attached to the rim 2A. A peripheral direction is represented by an arrow having the reference sign U. An axial direction is represented by an arrow having the reference sign A (FIG. 2). A radial direction is represented by an arrow having the reference sign R. Radially on the inside, the wheel disk 2 comprises a bolt circle 4 of the vehicle wheel 1. In the center of the bolt circle 4 there is arranged a so-called center opening 6, about an axis of rotation 5 of the vehicle wheel 1 extending in the axial direction A, which is sometimes also referred to as a hub borehole or center hole centering. In the present case, the bolt circle 4 comprises five screw holes 7, two of which are provided with a reference numeral.

The rim 2A is shown in FIG. 2 without a tire 3. The rim 2A comprises a rim well 8 and a rim flange 9, and the center opening 6 has a recessed peripheral groove 12.

Figure 3:
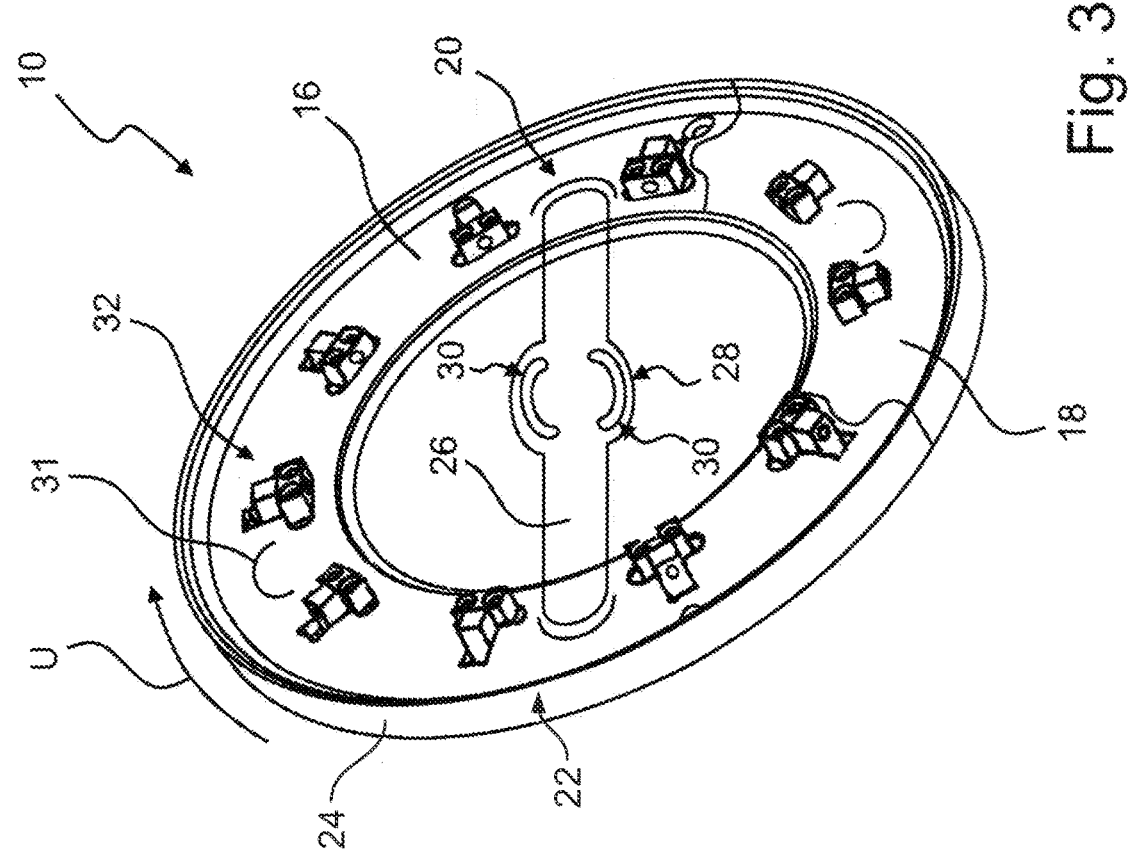
FIG. 3 shows a first embodiment of an attachment according to the invention in a perspective representation, looking at its side remote from the rim.

FIG. 3 shows an attachment 10 according to the invention, for example for the vehicle wheel 1 of FIG. 1. The attachment 10 comprises a first peripheral segment 16 which is of arcuate form and has a peripheral extent of about 270°, and a second peripheral segment 18 which is likewise of arcuate form and has a peripheral extent of about 90°. In the present case, the first peripheral segment 16 and the second peripheral segment 18 form a base body 20 of the attachment 10.

Figure 4:
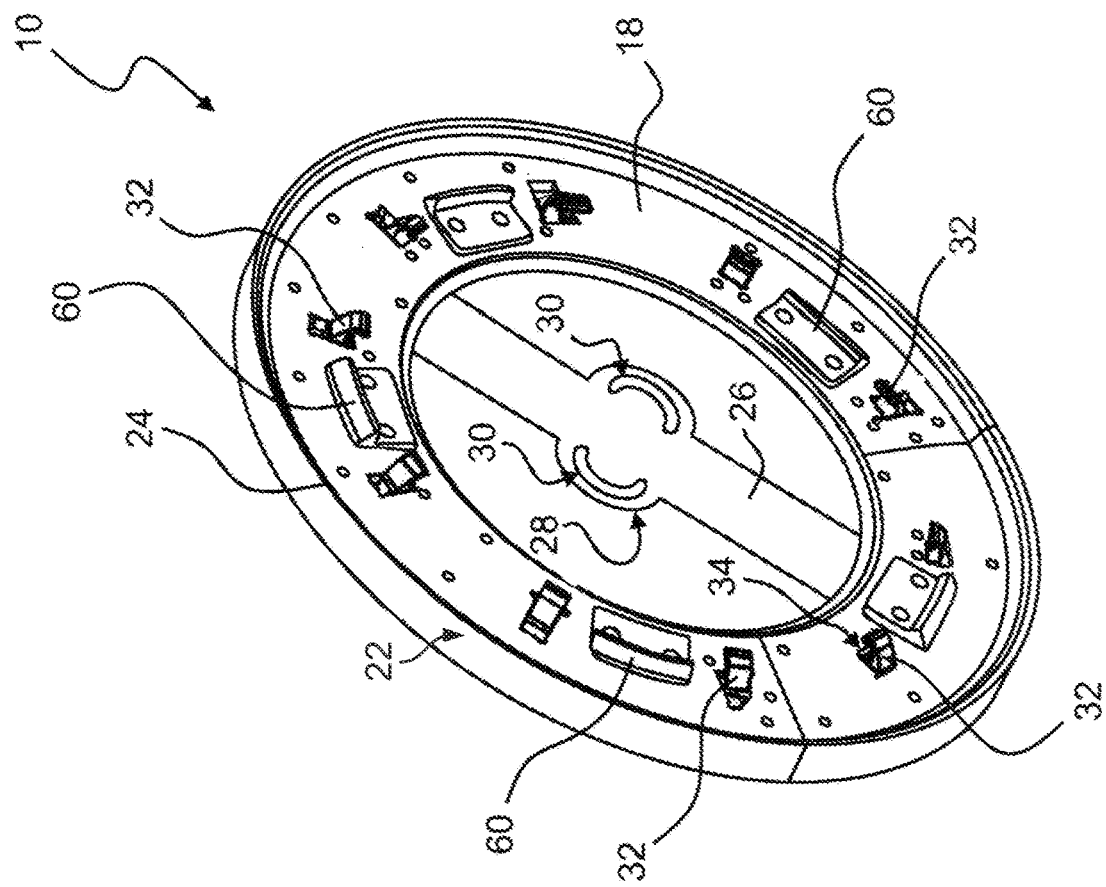
FIG. 4 shows the attachment of FIG. 3 in a perspective representation, looking at its side facing the rim.

In the embodiment of FIGS. 3 and 4, the second peripheral segment 18 is detachable from the first peripheral segment 16. However, embodiments in which the second peripheral segment 18 is attached in a folding or pivotable manner to the first peripheral segment 16 are also within the meaning of the invention (for example FIGS. 8 to 10).

It is preferred if the second peripheral segment has a peripheral extent of at least 45°, preferably at least 60°, preferably at least 90°, in particular at least 120°, in particular at least 150°.

It is preferred if the first peripheral segment has a peripheral extent of more than 180°, preferably of more than 190°, in particular of more than 195°.

In the operating state of the attachment 10, the base body has an annular tread surface 22. The tread surface 22 is formed by a tread body 24. The tread body 24 is generally, that is to say not limited to the present exemplary embodiment, produced preferably using a resilient polymer material. The tread body 24 preferably also comprises inner cavities which increase the resilience or damping capacity of the tread body 24.

The attachment 10 has a mounting element 26. In FIG. 3, the mounting element 26 is shown outside a mounting position. In FIG. 4, on the other hand, the mounting element 26 is in the mounting position.

In the mounting position, the mounting element 26 aligns the second peripheral segment 18 relative to the first peripheral segment 16 and urges the second peripheral segment 18 towards the wheel disk 2 of the vehicle wheel 1 when the first peripheral segment 16 is fastened to the vehicle wheel 1.

In the embodiment of FIGS. 3 and 4, the mounting element 26 is in the form of a rod, wherein it extends in the mounting position from the first peripheral segment 16 over the bolt circle 4, or the position of the bolt circle 4 when the attachment 10 is fastened to the vehicle wheel 1, to the second peripheral segment 18 (see FIG. 2).

In the region in which the mounting element 26 lies over the bolt circle 4, the mounting element has a widened portion 28. In the widened portion 28, the mounting element 26 has two screw receivers 30 in the form of curved slots 30. By means of the slots 30, the mounting element 26 is pivotable relative to the first or second peripheral segment 16, 18, even when there are screws in the slots 30. How the mounting element 26 can be mounted via screws in the slots 30 will be explained in greater detail hereinbelow. A displaceable form of the mounting element 26 is likewise conceivable and within the meaning of the present invention (see, for example, FIG. 12).

Securing devices 31 for the mounting element 26 are arranged on the first peripheral segment 16 and on the second peripheral segment 18. The securing devices 31 are shown schematically in FIG. 3 and serve to fix the position of the mounting element 26 in the peripheral direction U relative to the first peripheral segment 16 or the second peripheral segment 18.

The screw receivers 30, in the form of slots, of the mounting element 26 in any case correspond to a portion of the hole pattern of the bolt circle 4 of the vehicle wheel 1. This means that at least two screws which are introduced into the hole pattern of the bolt circle 4 are so arranged that they are located, when seen in the axial direction A, in the region of the screw receivers 30, that is to say a corresponding screw can be guided through them.

A plurality of clamping means 32 having a hook portion 34 are arranged on the first peripheral segment 16 and on the second peripheral segment 18, wherein the hook portion 34 is configured to engage behind a rim flange 9 of the rim 2A of the vehicle wheel 1 in an operating state of the attachment 10.

Figure 5:
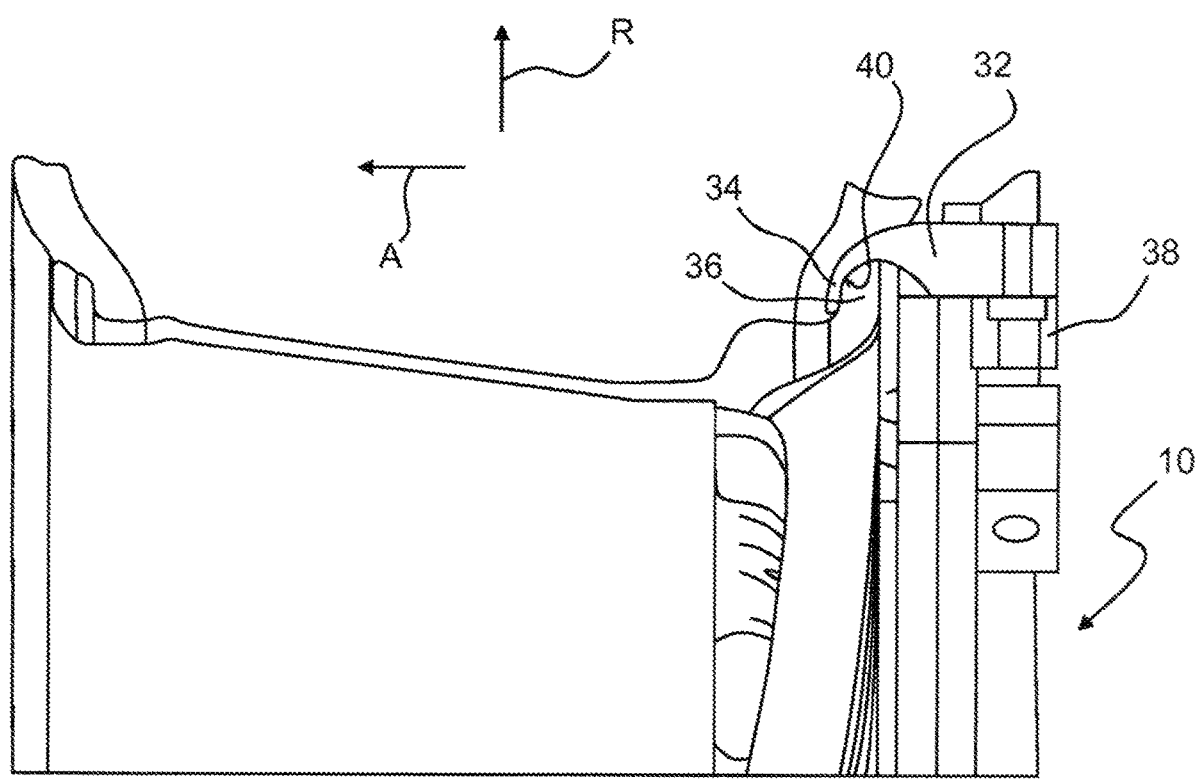
FIG. 5 shows a clamping means of the attachment of FIGS. 3 and 4 engaged behind the rim.
Figure 6:
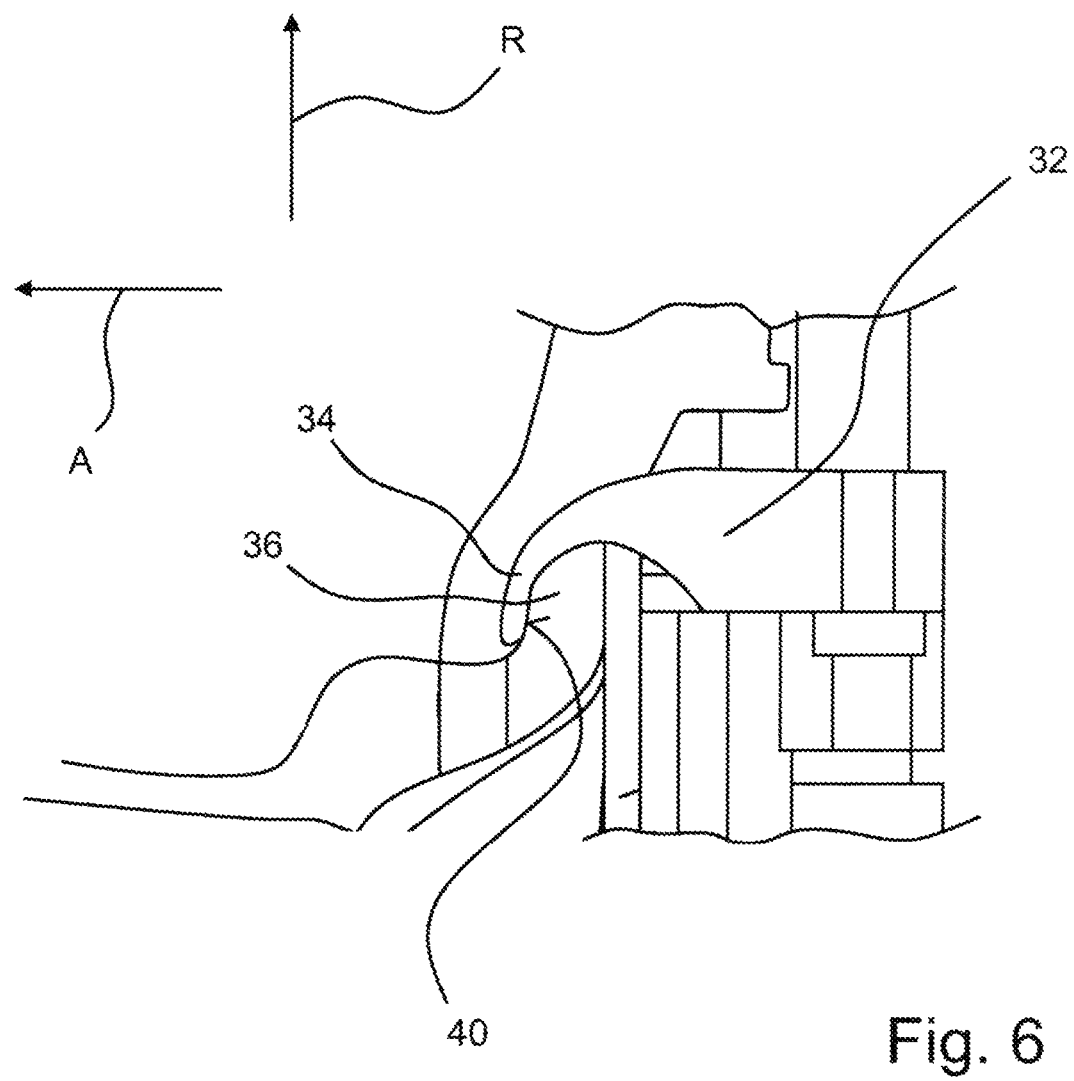
FIG. 6 shows part of FIG. 5 in an enlarged representation.

This engagement behind the rim flange 9 of the rim 2A is shown in FIG. 5 and on an enlarged scale in FIG. 6.

The clamping means 32 can, for example, as shown in FIG. 5, be detachably and movably fastened to holding lugs 38. However, the clamping means 32 can also comprise a receiving device for a lever, so that they can be pivoted via a corresponding lever onto the rim flange 9, where they can preferably be latched. Advantageously, the clamping means 32 are so configured that they are arranged recessed in the attachment 10 after they have been clamped to the rim 2A.

The clamping means 32 comprise a clamping surface 40 which, when seen in the axial direction A, slopes radially inwards in a curved manner. The clamping means 32 are so configured that the clamping surface 40 moves radially inwards when the attachment 10 is fastened and clamped to the rim 2A, and the clamping surface 40 is so configured that the attachment 10 is urged in the axial direction A towards the rim 2A when it is fastened and clamped to the rim 2A of the vehicle wheel 1.

Figure 7:
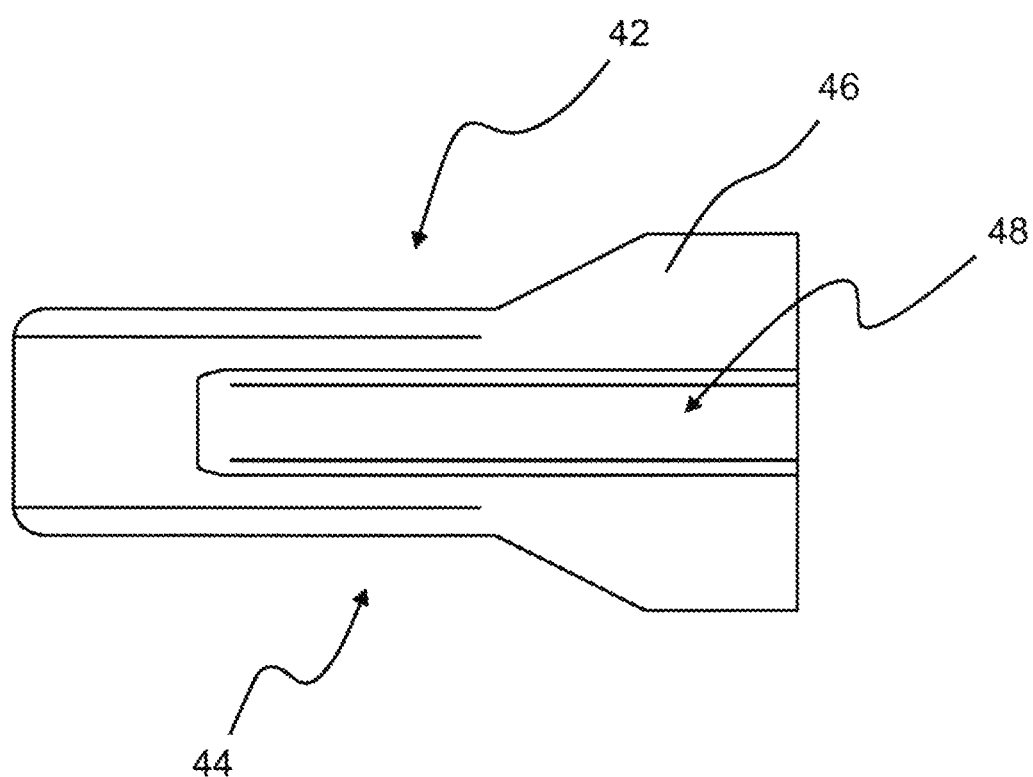
FIG. 7 shows an attachment fastening screw.

FIG. 7 shows an attachment fastening screw 42. The attachment fastening screw 42 is provided in its front region with a thread 44 which corresponds to the thread of a conventional screw for fastening the vehicle wheel 1. In the region of the head 46, the attachment fastening screw 42 has an internal thread 48.

For mounting of the attachment 10, a standard fastening screw of the vehicle wheel 1 can first be removed and replaced by an attachment fastening screw 42 having the internal thread 48 in its head 46. A further screw (not shown) can then be screwed into the internal thread 48 in the head 46 of the attachment fastening screw 42, via which further screw the mounting element 26 can be fastened to the vehicle wheel 1. The further screw thereby extends through the slots 30 so that, by loosening the further screw, pivotability of the mounting element 26 is obtained.

FIGS. 8-11 show alternative embodiments of the attachment 10. In the embodiments shown in FIGS. 8-11, the first peripheral segment 16 in each case has a fastening portion 50. The fastening portion 50 in each case extends in the manner of a chord over the region of the bolt circle of the vehicle wheel 1.

The second peripheral segment 18 is in each case pivotably attached to the first peripheral segment 16 via two hinge devices 52. The peripheral extent of the arcuate first peripheral segment 16 is in each case slightly more than 190°.

In each of FIGS. 8 to 11 denoted a), the mounting element 26 has been pivoted out of the mounting position. In each of FIGS. 8 to 11 denoted b), the mounting element 26 is shown in the mounting position.

The embodiments of FIGS. 8-10 differ only by the form of the mounting element 26. In the embodiment according to FIG. 8, the mounting element 26 is in rod form and extends in the fitting state (FIG. 8b) from the first peripheral segment 16 over the region of the bolt circle 4 to the second peripheral segment 18. The mounting element 26 is thereby pivotably mounted on the fastening portion 50.

In the embodiment according to FIG. 9, the mounting element 26 is likewise in rod form. However, the mounting element 26 of FIG. 9 is shorter than that of FIG. 8, so that it extends in the fitting state from the region of the bolt circle 4 to the second peripheral segment 18. The mounting element 26 is thereby likewise pivotably mounted on the fastening portion 50, whereby it is able, when the first peripheral segment 16 is fastened to the vehicle wheel 1, to align the second peripheral segment 18 relative to the first peripheral segment 16 and urge it towards the wheel disk 2 of the vehicle wheel 1.

In the embodiment of FIG. 10, the mounting element 26 is V-shaped, wherein two legs 54 of the mounting element 26 extend in the mounting position from the region of the bolt circle 4 to the second peripheral segment 18.

In the embodiment shown in FIG. 11, the second peripheral segment 18 comprises a support portion 56 which prevents the mounting element 26, which is eccentrically mounted in the region of the bolt circle 4, from being pushed under the second peripheral segment 18 in the case of improper operation. The support portion 56 is rigidly connected to the second peripheral segment 18 and is pivotably mounted relative to the fastening portion 50 via a further hinge 58.

Figure 12:
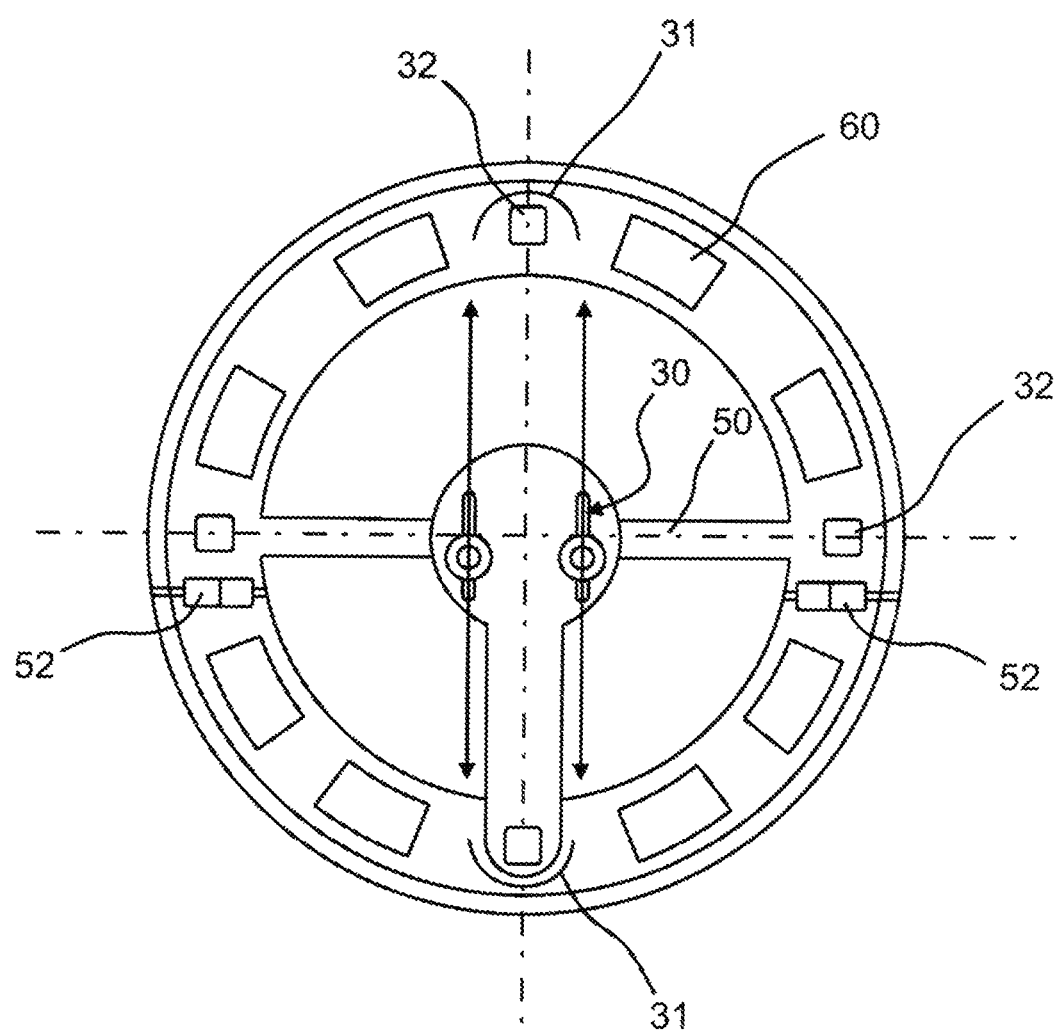
FIG. 12 shows a further embodiment of an attachment according to the invention in a schematic representation.

In the embodiment shown in FIG. 12, the mounting element 26 is displaceably mounted in the region of the bolt circle 4 by means of the slots 30.

The securing devices 31 are preferably arranged in the region of the clamping means 32.

The attachments 10 can comprise positioning devices 60. Such positioning devices 60 serve to position the attachment in a centered manner on the wheel disk 2 of the vehicle wheel 1, wherein the positioning device 60 can preferably be actuated independently of the clamping means 32. Such positioning devices 60 are preferably so configured that the attachment 10 can be clipped onto the rim 2A of the vehicle wheel 1. Via the positioning devices 60, the attachment 10 can be attached loosely and in a centered manner to the vehicle wheel 1.

As in the case of the attachment 10 that does not comprise a positioning device 60, the attachment 10, or initially the first peripheral segment 16, can then be fastened to the vehicle wheel, for example, via the fastening portion 50, for example by screwing the fastening portion 50 by means of attachment fastening screws 52 in the region of the bolt circle 4. Fastening of the first peripheral segment is carried out in the upper region of the vehicle wheel 1, so that the vehicle wheel 1 does not have to be removed from the vehicle and the first peripheral segment 16 nevertheless does not come into contact with the road surface. However, provisional fastening via other external means for fastening, for example via a tension belt, is also conceivable. The first peripheral segment 16 can then be fixedly clamped to the vehicle wheel 1 in its final position by means of the clamping means 32. The vehicle is then moved by half a turn of the wheels. The first peripheral segment 16 is then in the lower region of the vehicle wheel 1 and in contact with the road surface. The second peripheral segment 18 can then be folded into its final configuration or, in the case of an embodiment as shown in FIGS. 3 and 4, inserted. By means of the mounting element 26, the second peripheral segment 18 can then be reliably aligned relative to the first peripheral segment 16 and urged towards the vehicle wheel 1. Final fastening of the second peripheral segment 18 can then likewise be carried out via clamping means 32 which are optionally present.

Figure 13:
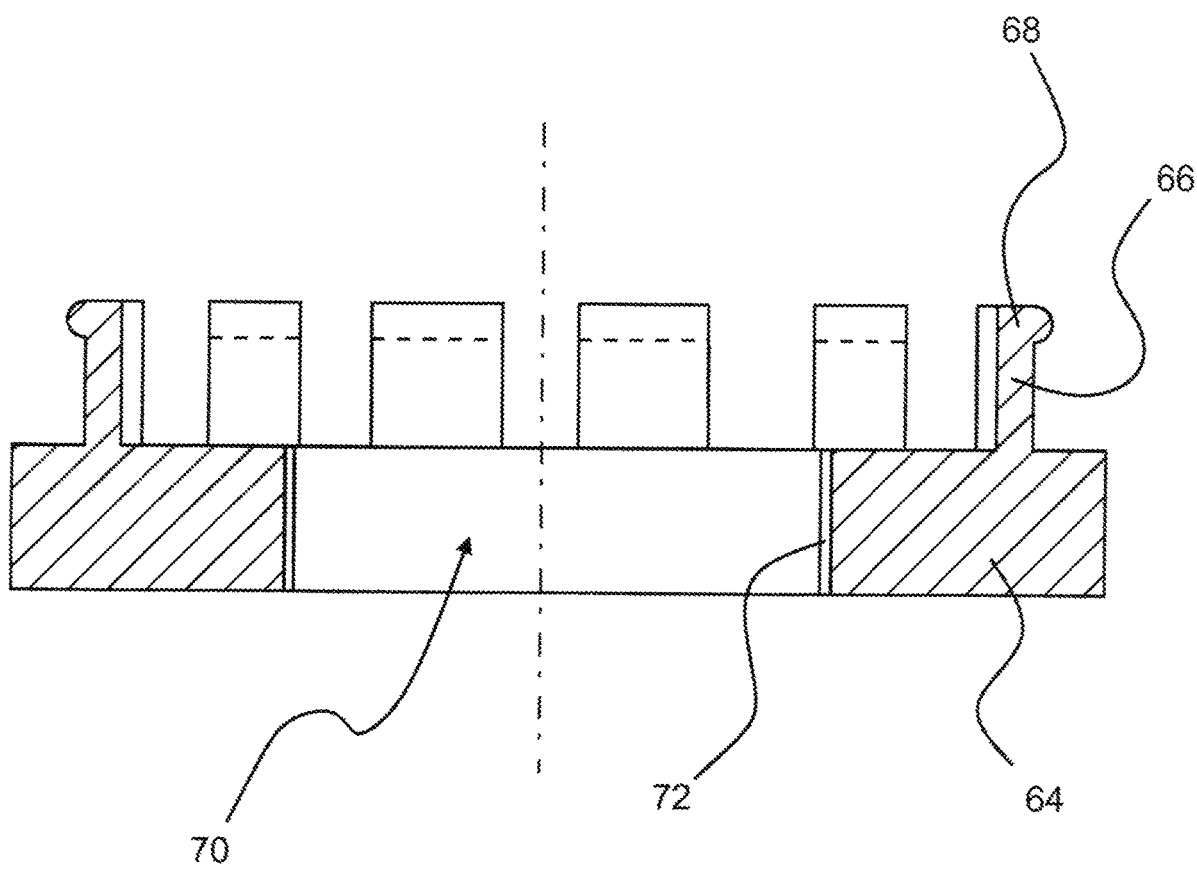
FIG. 13 shows an engagement element of a mounting element.
Figure 14:
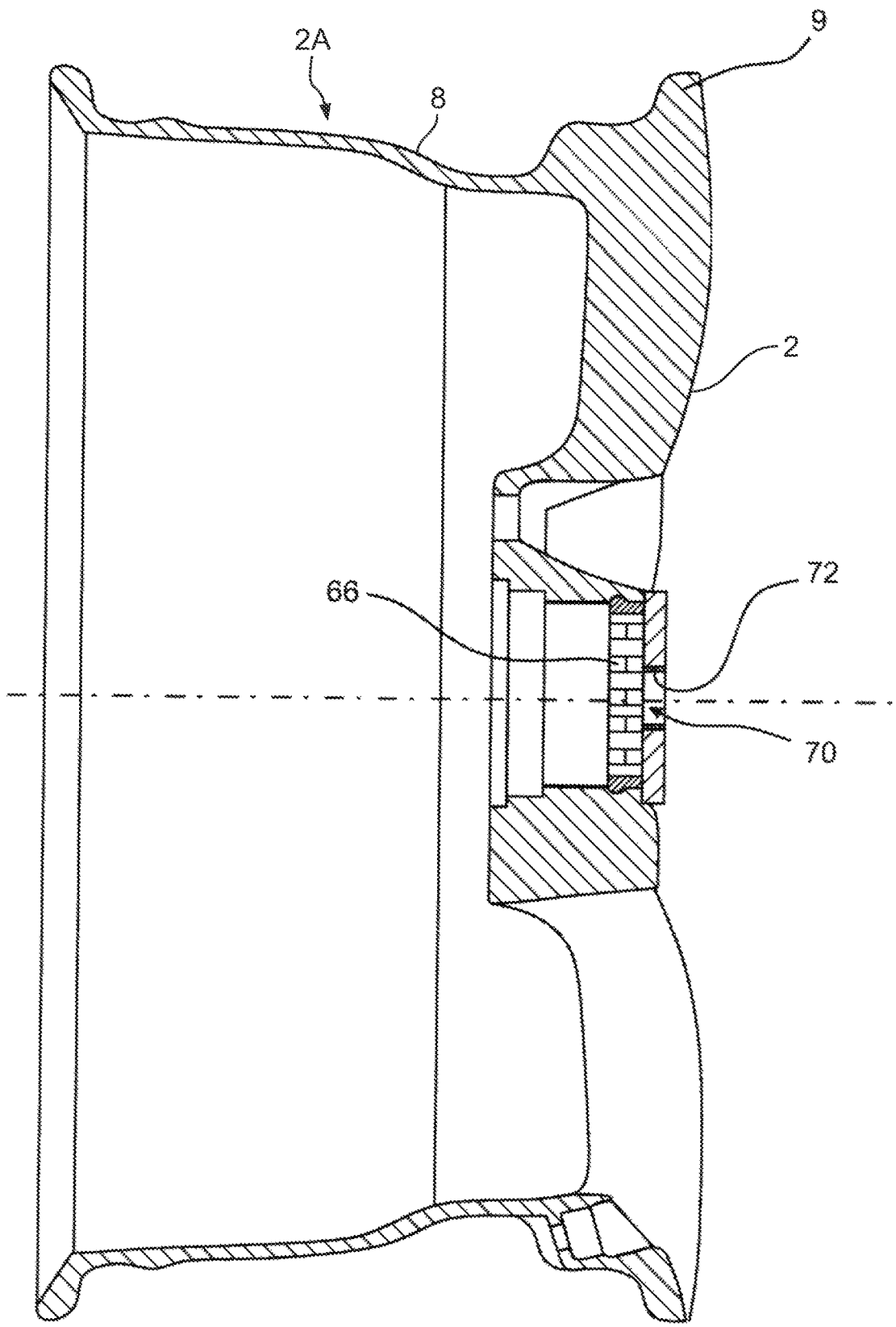
FIG. 14 shows the engagement element of FIG. 13 in the state engaged in a center opening.
Figure 15:
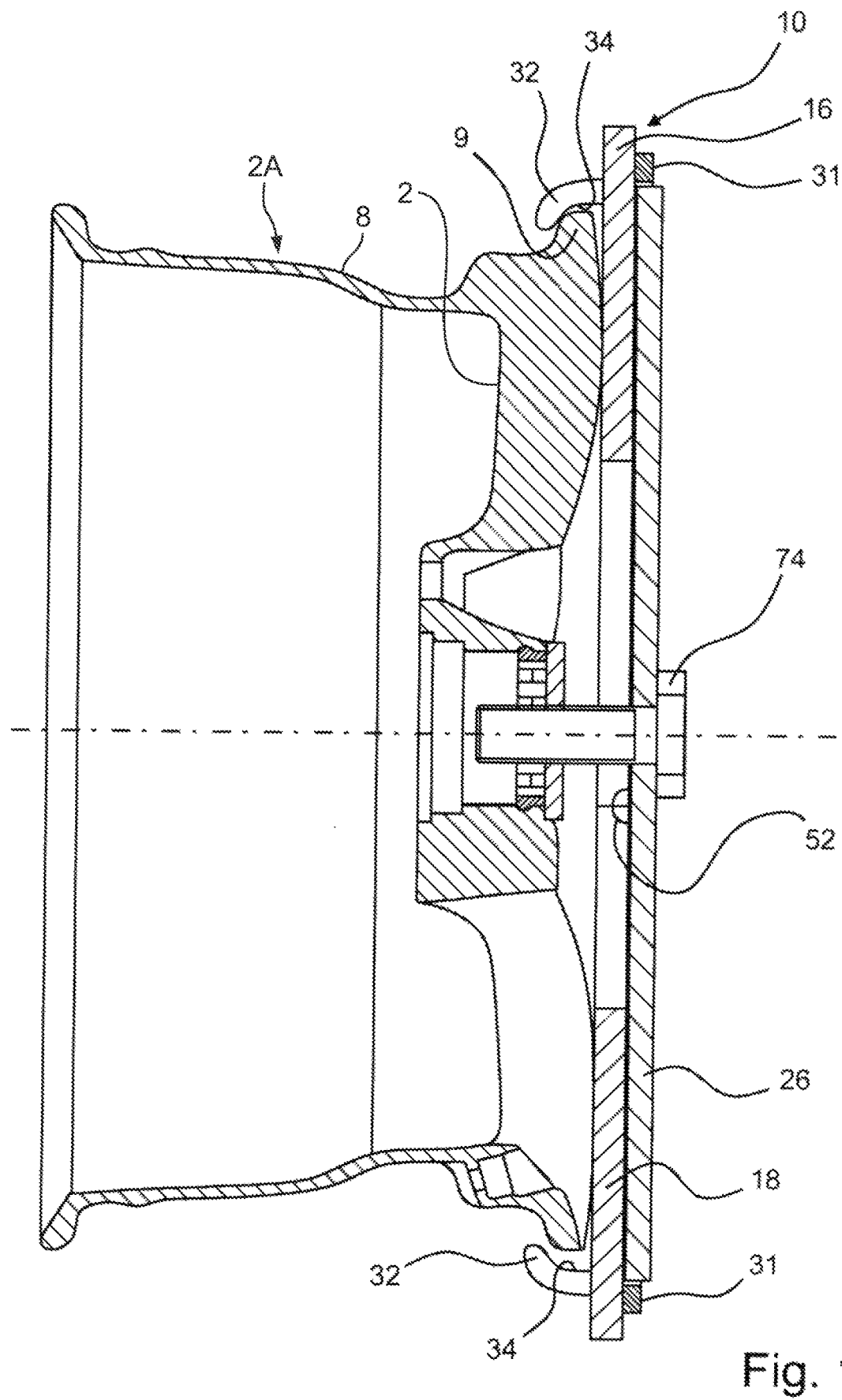
FIG. 15 shows an attachment which has been fastened to a rim via the engagement element.

FIGS. 13-15 show a further embodiment of the attachment 10 according to the invention.

In this attachment, the mounting element 26 is so configured that it is not screwed into the screw holes 7 of the bolt circle 4 but is fastened via the center opening 6.

For this purpose, the mounting element 26 comprises an engagement element 64 shown in FIG. 13. The engagement element 64 has in the present case flexible fingers 66, which each comprise an engagement portion 68 which is configured to engage into the peripheral groove 12 of the center opening 6. The engagement element 64 has a central opening 70 with an internal thread 72.

The engagement element 64 can be clipped into the center opening 6. This clipped-in state is shown in FIG. 14.

In a subsequent step, the attachment 10, or the first peripheral segment 16 thereof, can be fastened to the wheel disk 2 by means of the mounting element 26. For this purpose, the mounting element 26 is clamped against the engagement element 64 via a clamping screw 74, which represents an embodiment of a clamping element 74 (FIG. 15). Generally, a clamping element means an element with which the mounting element 26, or the fastening portion 50, can be pulled towards or clamped against the engagement element 64. The clamping means 32 are then actuated so that they engage behind the rim flange 9. Via the clamping surfaces 34, the attachment 10, or the first peripheral segment 16, is urged in the direction towards the wheel disk 2. The second peripheral segment 18 is then folded down. The clamping screw 74 is released. The mounting element 26 is moved into the mounting position, so that it aligns the second peripheral segment 18 relative to the first peripheral segment 16 and urges it towards the wheel disk 2 of the vehicle wheel 1. This state is shown in FIG. 15. The clamping means 32 on the second peripheral segment 18 are then actuated, so that they likewise engage behind the rim flange 9.

As illustrated in FIG. 16, such a fastening via the center opening 6 can also be used for fastening the fastening portion 50. The embodiment according to FIG. 16 otherwise corresponds to the embodiment according to FIG. 10.

Fastening via the center opening 6 is in principle possible for the fastening portion 50 and also for the mounting element 26 by means of an engagement element 64 which is configured differently to the engagement element 64 of FIGS. 13-15. The engagement element 64 can be capable of being connected, for example, directly, that is to say without a clamping screw 74, to the fastening portion 50 and also to the mounting element 26. The engagement element 64 can be configured to engage behind a portion of the center opening 6 in a form-fitting manner. Such a form-fitting engagement can be formed, for example, via the resiliently pivotable or bendable fingers 66. However, an embodiment is also conceivable in which an engagement portion 68 is expandable, for example by means of a grub screw, and can thereby be clamped in the center opening 6.

Figure 17:
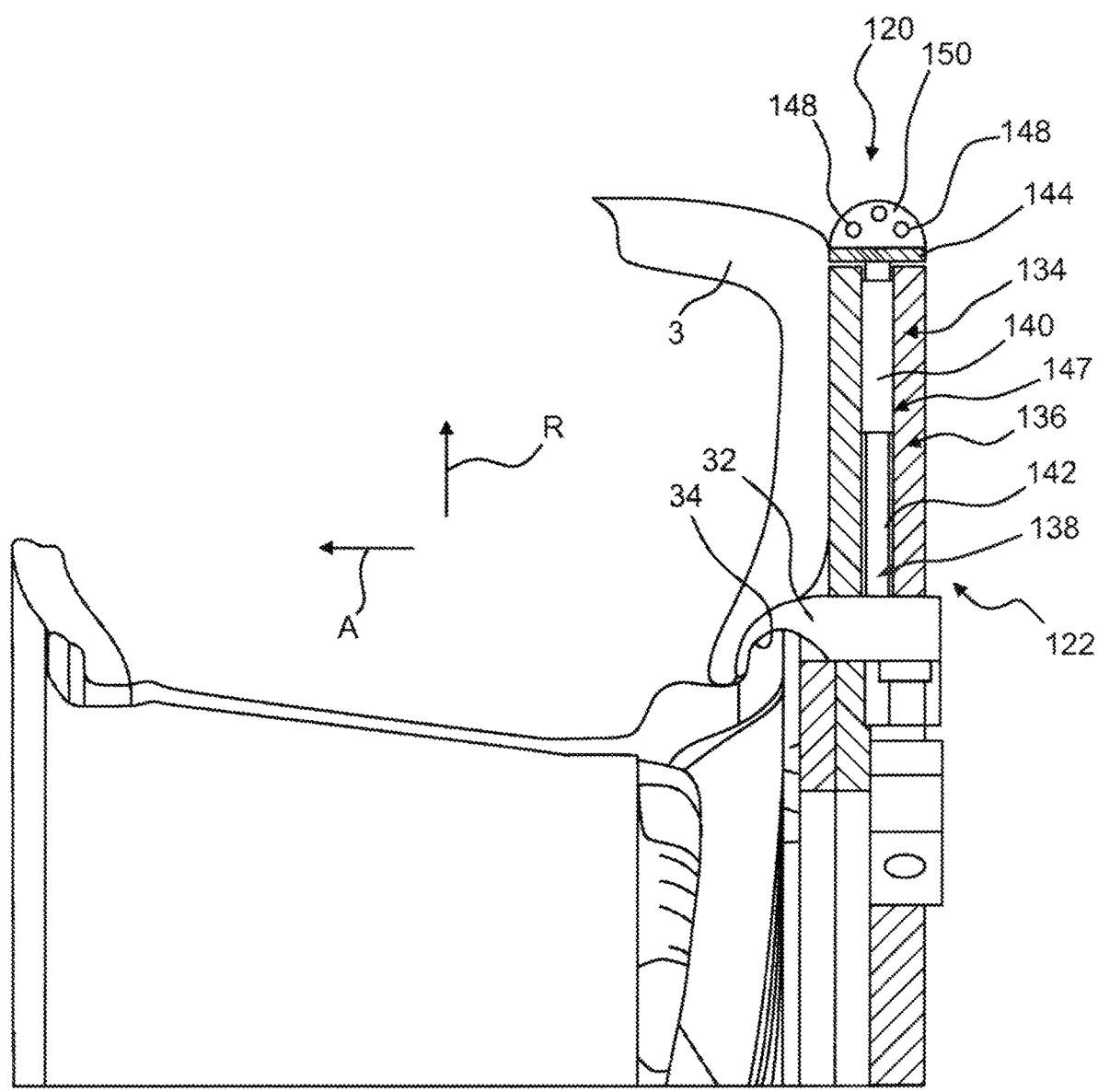
FIG. 17 shows an attachment according to the invention having a clamping mechanism.

In FIG. 17, the engagement of the clamping means 32 behind the rim flange 9 is shown by means of a further embodiment according to the invention. The embodiment of FIG. 17 comprises clamping means 32 which are configured to engage with their hook portion 34 behind a portion 9, in particular a rim flange 9, of a rim 2A of the vehicle wheel 1. The attachment 10 comprises a clamping mechanism 122 having a contact portion 120 which is configured to actuate the clamping means 32 and bring the hook portion 34 into engagement behind the portion 9 of the rim 2A, in the present case the rim flange 9, when the contact portion 120 is actuated, in particular subjected to pressure. The attachment further comprises a pressure transmission device 134 having a ratchet device 136. The ratchet device 136 comprises a pressure cylinder 138 having a first cylinder part 140 and a second cylinder part 142. The clamping means 32 can be actuated via the contact portions 120 in such a manner that, when actuated, they engage behind a portion 9, in the present case the rim flange 9, of the rim 2A. The clamping means 32 is mechanically coupled with its associated contact portion 120 via the ratchet device 136. This means, in the present case, that, by a movement of the contact portion 120, a force can be transmitted via the ratchet device 136 to the clamping means 32. When the vehicle wheel 1 with the attachment 10 fastened thereto via the fastening portion 50 rolls away, the contact portions 120 are moved radially inwards as a result of contact with the road. The clamping means 32 are thereby actuated, or in the present case a force is transmitted to the clamping means 32. The clamping means 32 are pressed by that force towards the rim 2A or the rim flange 9. If a specific force, or a limit pressure, with which the clamping means 32 is pressed towards the rim flange 9 during this force transmission is exceeded, the two cylinder parts 140 and 142 are pushed into one another. This happens, for example, when the contact portion 120 has not yet reached its end position but the hook portion 34 is already engaged completely behind the rim flange 9 and is resting thereon. In the present embodiment, the contact portion 120 is in the form of a spring steel sheet 144 which is curved in the peripheral direction and which urges a portion of the tread body 24 radially outwards. This portion of the tread body 24 thus deviates in the unloaded state from the annular form of the remainder of the tread body 24 and is pressed inwards as the vehicle rolls over the road surface, wherein the force is transmitted via the pressure transmission device 134 and the ratchet device 136 to the clamping means 32.

In the present case, the tread body 24 comprises cavities 148 which are arranged in a resilient material 150. The tread body 24 is thus particularly flexible and damping.

The pressure transmission device 134 with the ratchet device 136 also comprises a holding mechanism 147. In the present exemplary embodiment, the holding mechanism 147 is so configured that it locks the two cylinder parts 140 and 142 together when the contact portion 120 has entered the tread surface 22 completely. Other forms of the holding mechanism 147 are conceivable. The holding mechanism 147 prevents the clamping means 32 from moving out of engagement behind the portion of the rim 9, or the rim flange 9, if the contact portion 120 is no longer resting on the road surface F. The holding mechanism 147 can preferably be released from its latched state by a tool.

Figure 18:
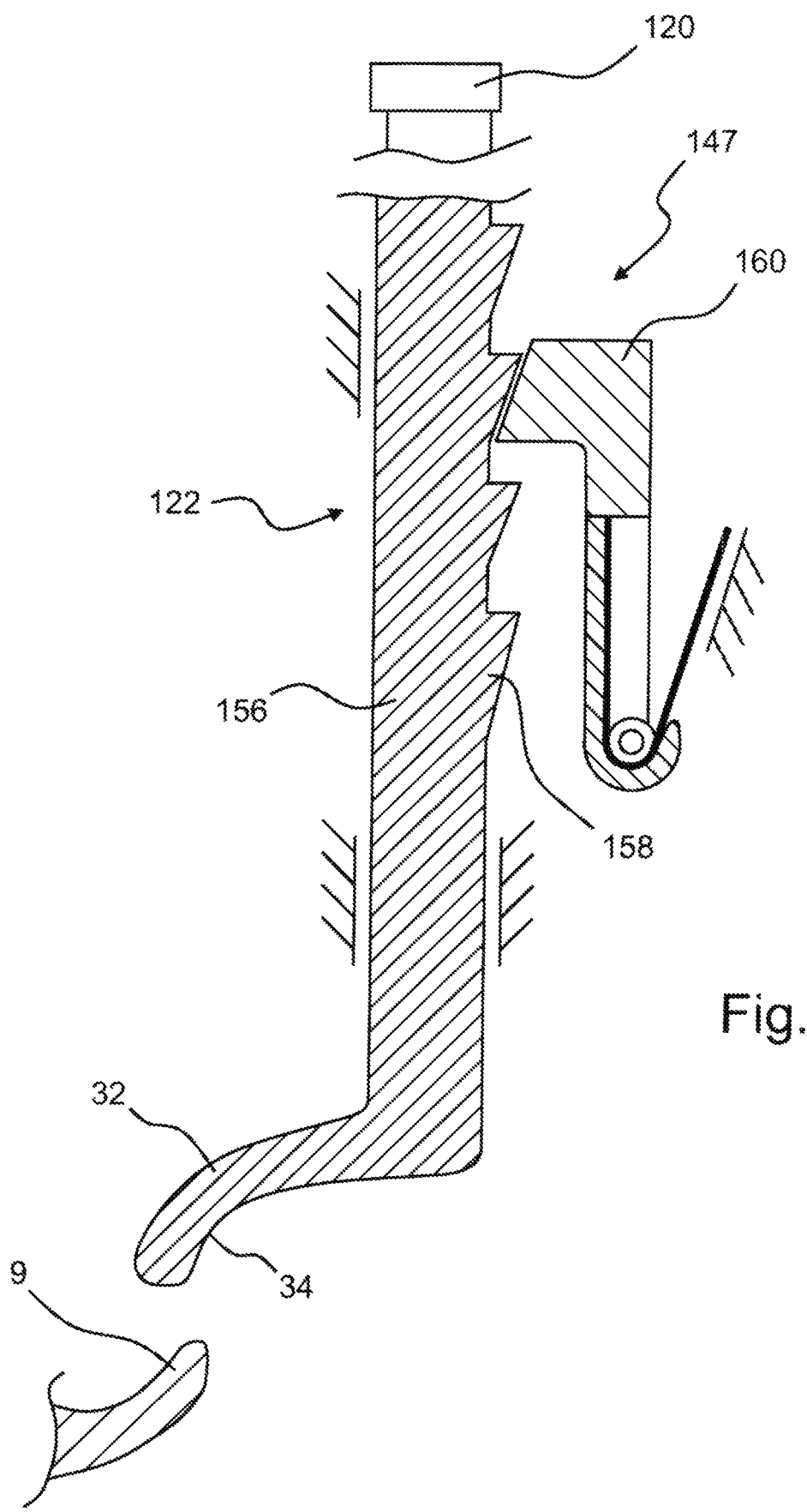
FIG. 18 shows an alternative form of a clamping mechanism.

Further possible forms of a clamping mechanism 122 are shown in FIGS. 18 to 21. FIG. 18 shows an embodiment in which the clamping means 32 is connected to the contact portion 120 via a shaft 156, which forms a force transmission element 156. Arranged on the shaft 156 are angled projections 158, into which a spring-mounted latching mechanism 160 can engage. The latching mechanism 160 together with the projections 158 forms a holding mechanism 147 which holds the hook portion 34 in contact with the rim flange 9 when it rests thereon. The holding mechanism 147 is shown only schematically in FIG. 18, for example the spacing of the individual angled projections 158 can be substantially finer than is shown in FIG. 18.

Figure 19:
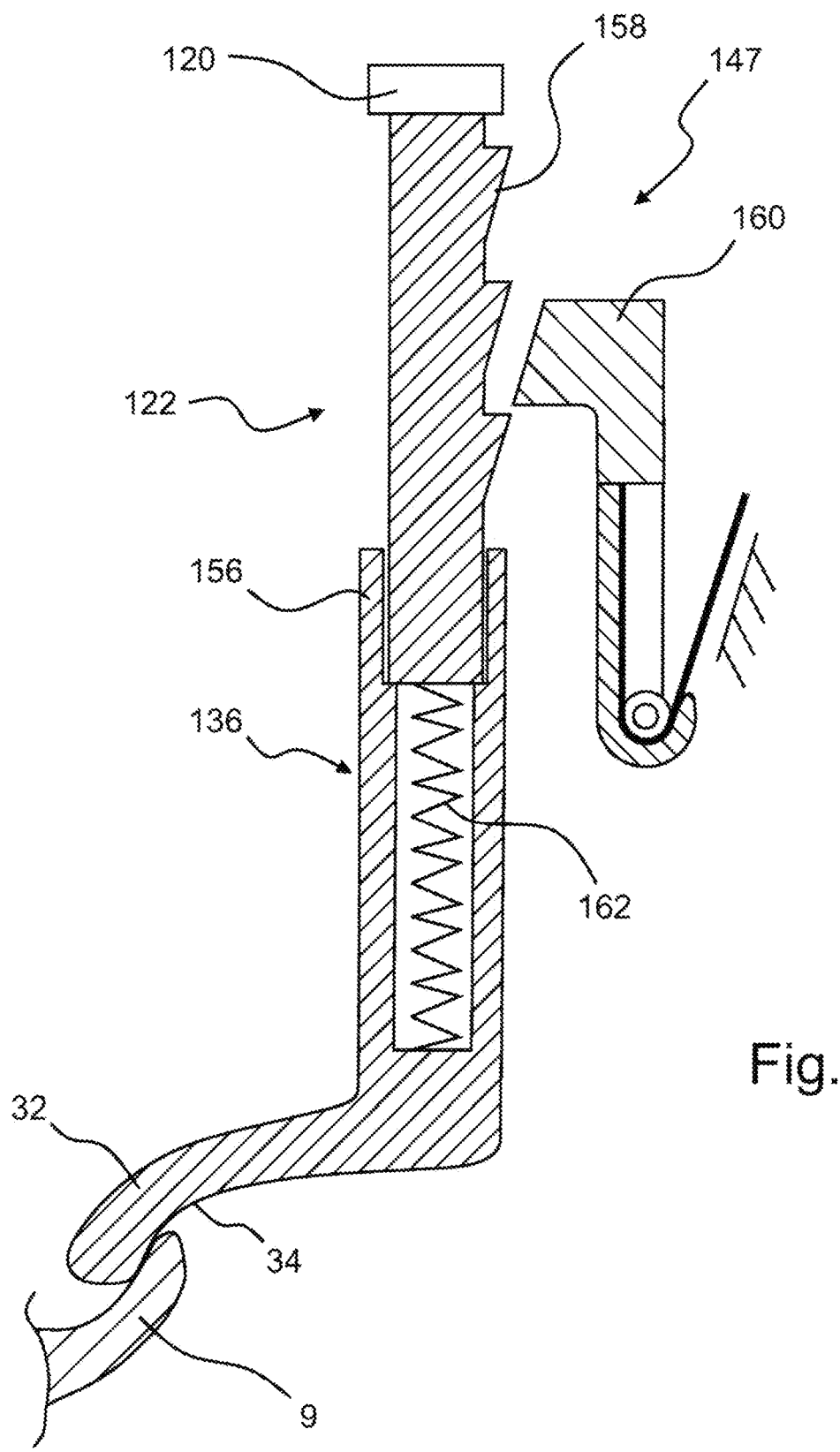
FIG. 19 shows an alternative form of a clamping mechanism.

FIG. 19 shows a further clamping mechanism 122. The holding mechanism 147 of this embodiment is similar to that of FIG. 18. The clamping mechanism 122 of FIG. 19 additionally has a ratchet device 136. The ratchet device 136 comprises a spring 162 which is arranged in the shaft 156. By means of the spring 162, the shaft 156 is resiliently compressible in its extent from the hook portion 34 to the contact portion 120. The contact portion 120 is thus movable further radially inwards, or towards the rim flange 9, even when the hook portion 34 is already resting against the rim flange 9 and can no longer be moved further radially inwards. The ratchet device 136 at the same time also forms a pressure limiting device 152, since it limits the pressure with which the clamping means 32 contacts the rim 2A, or the rim flange 9, to a limit pressure. As soon as the hook portion 34 rests against the rim flange 9 and the contact portion 120 further exerts pressure in the radially inwards direction, the spring 162 is compressed so that the pressure with which the clamping means 32 rests against the rim flange 9 is limited to the pressure that is necessary for compressing the spring 162, that is to say the limit pressure of the pressure limiting device 152.

Figure 20:
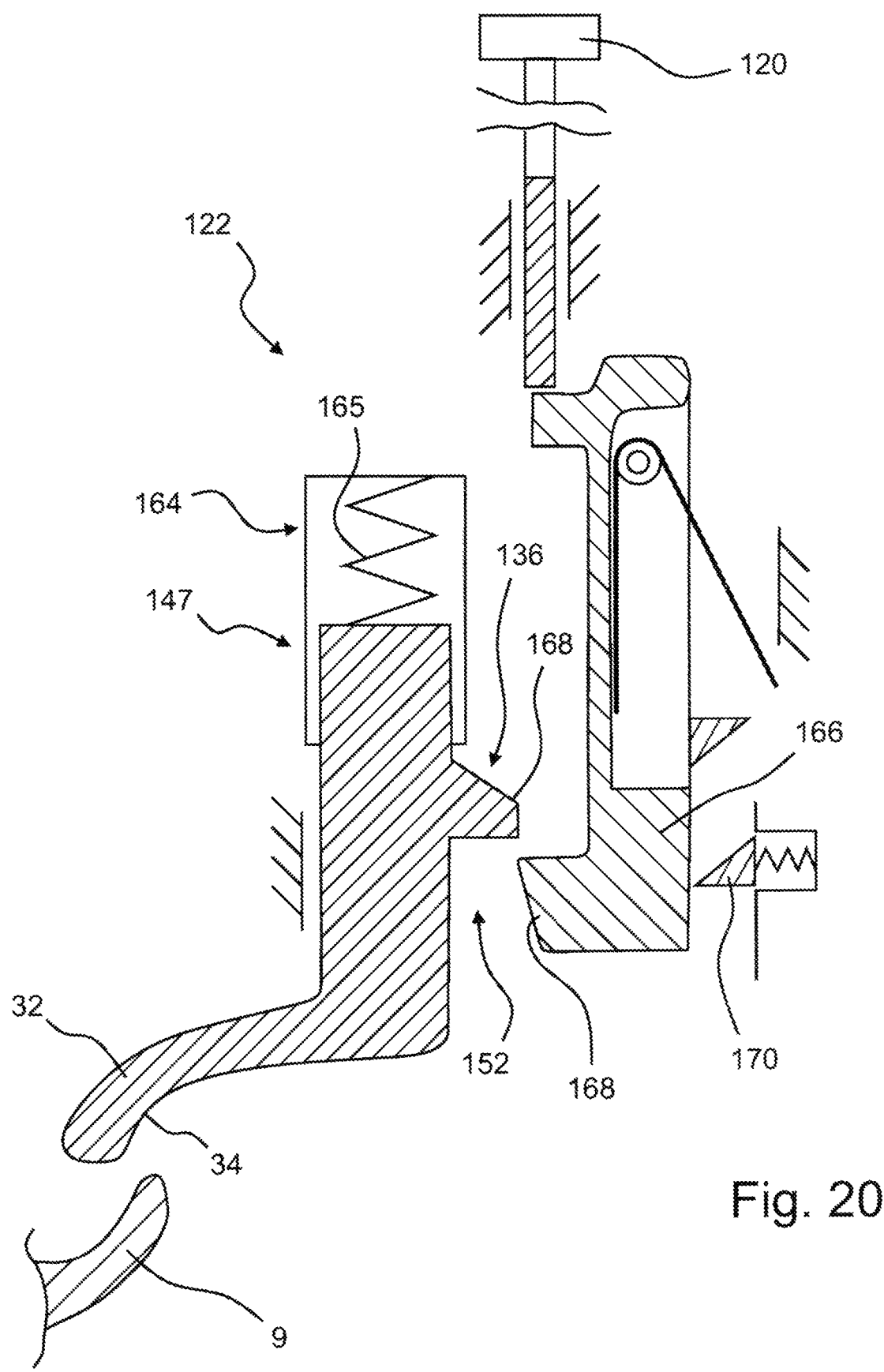
FIG. 20 shows an alternative form of a clamping mechanism.

FIG. 20 shows an embodiment variant in which the clamping mechanism 122 comprises a biasing device 164 which biases the clamping means 32 in the direction towards the rim flange 9. Biasing of the clamping means 32 is in the present case spring-based via the spring 165. However, an embodiment by means of a pressure medium reservoir, for example pneumatic biasing, is also conceivable. A retaining element 166 is thereby so arranged that it retains the clamping means 32 until the contact portion 120 is moved radially inwards as a result of contact with the road surface and the retaining element 166 is thereby likewise moved radially inwards. If the retaining element 166 is moved radially inwards, it releases the clamping means 32, so that the clamping means 32 is likewise moved radially inwards as a result of its biasing and comes into contact with the rim flange 9.

The embodiment of FIG. 20 has a pressure limiting device 152 and a ratchet device 136, which are formed by the two mutually interhooking portions 168 on the shaft 156 of the clamping means 32 and the retaining element 166. If the clamping means 32 is resting against the rim flange 9, the hooking portion 168 which is arranged on the retaining element 166 can move further radially inwards and lift from the hooking portion 168 on the shaft 156 of the clamping means 32. The clamping means 32 then rests against the rim flange 9 with a precisely defined pressure owing to its spring biasing.

The biasing device 164 of the clamping mechanism 122 in FIG. 20 also forms, together with the spring-mounted projection 170, the holding mechanism 147 which is configured to hold the clamping means 32 in its position when the clamping means 32 is in engagement with its hook portion 34 behind the portion 9 of the rim 2A, preferably the rim flange 9.

Figure 21:
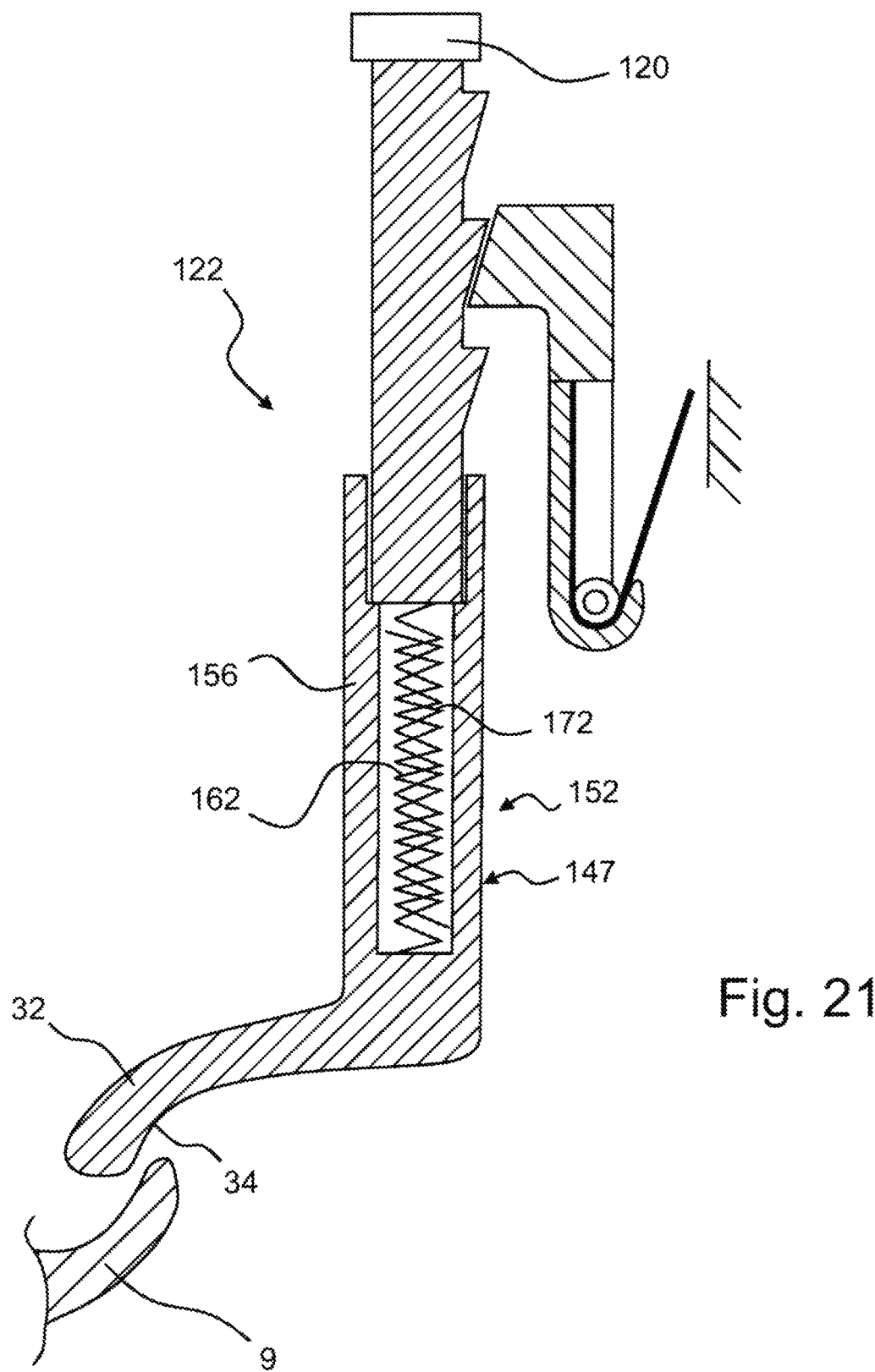
FIG. 21 shows an alternative form of a clamping mechanism.

FIG. 21 shows an embodiment variant which is similar to the embodiment of FIG. 19. However, in the embodiment of FIG. 21, the spring 162 of the embodiment of FIG. 19 is supplemented by a plastically deformable element 172. Activation of the ratchet device 136 can thus be adjusted to a higher pressure than the contact pressure (specified by the spring 162 of the holding mechanism 147) with which the hook portion 34 contacts the rim flange 9. The ratchet device 136 is active only when the pressure exerted on the clamping means 32 by the contact portion 120 in the direction towards the rim flange 9 is sufficiently great to plastically deform the plastically deformable element 172. The holding mechanism 147, on the other hand, acts with the force of the spring 162.

Figure 22:
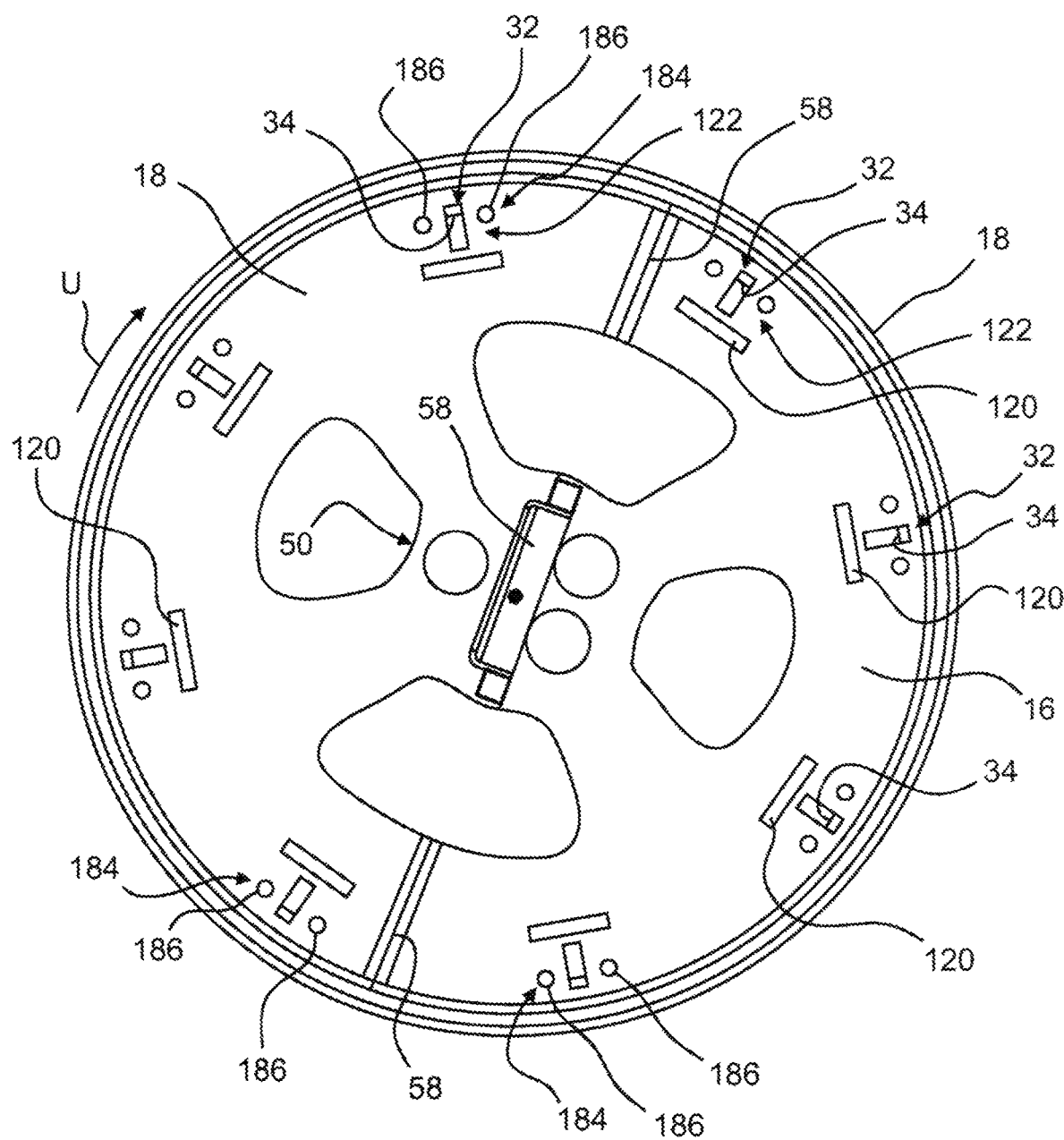
FIG. 22 shows an alternative form of an attachment having a clamping mechanism.

FIG. 22 shows an alternative embodiment of the attachment 10 according to the invention, looking at its side that faces the vehicle wheel 1 in the fitting state. A plurality of contact portions 120 are arranged on the attachment 10 distributed around the periphery of the attachment 10 or the tread surface 18. The contact portions 120 are so arranged that, when attached as intended to the vehicle wheel 1, they face the vehicle wheel 1 and can contact the vehicle wheel 1, in particular the wheel disk 2.

The attachment 10 shown in FIG. 22 and the respective clamping mechanisms 122 are so configured that the contact portions 120 contact the wheel disk 2 when the attachment 10 is attached and are thereby actuated. As a result of the actuation of the contact portions 120, the clamping means 32 associated with the respective contact portion 120 are actuated via the respective clamping mechanism 122 and brought into engagement behind the rim flange 9. However, the clamping means 32 can also be so configured and arranged that they engage behind the rim 2A in a portion other than the rim flange 9.

Figure 23:
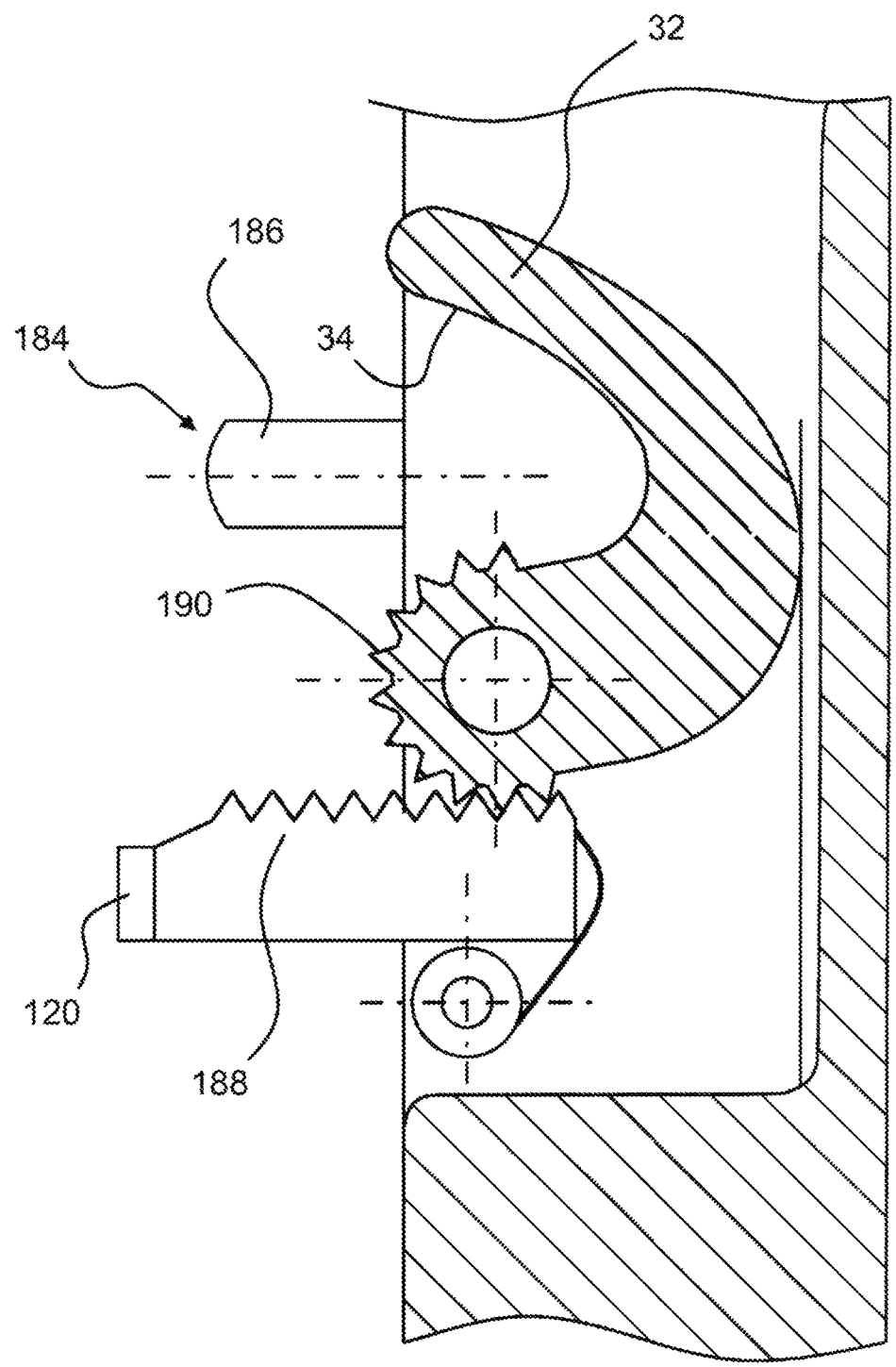
FIG. 23 shows the clamping mechanism of the attachment of FIG. 22 in detail.

In the embodiment of FIG. 22, the clamping means 32, or clamping mechanisms 122, are so configured that the clamping means 32 engage behind the rim flange 9 in a pivoting manner when they are actuated. The clamping means 32 are shown in detail in FIGS. 23 and 24.

The attachment of FIG. 22 comprises tire displacement devices 184 which are configured to displace the tire 3 away from the rim flange 9 in the axial direction on attachment of the attachment 10 and on actuation of the clamping means 32. The tire displacement devices 184 are each associated with a clamping means 32 and are formed separately from the clamping means 32. However, a tire displacement device 184 can also be integrated in the clamping means 32.

In the present example, the individual tire displacement devices 184 are each in the form of two projections 186 which are arranged in the peripheral direction U on either side of the respective clamping means 32 with which they are associated. The projections 186 project in the axial direction A from the side of the attachment 10 facing towards the wheel disk 2 and in the present case are in rod form.

The contact portions 120 are coupled via a respective toothed rod portion 188 with a toothing system 190 of the clamping means 32. This will be discussed in greater detail hereinbelow.

Figure 24A:
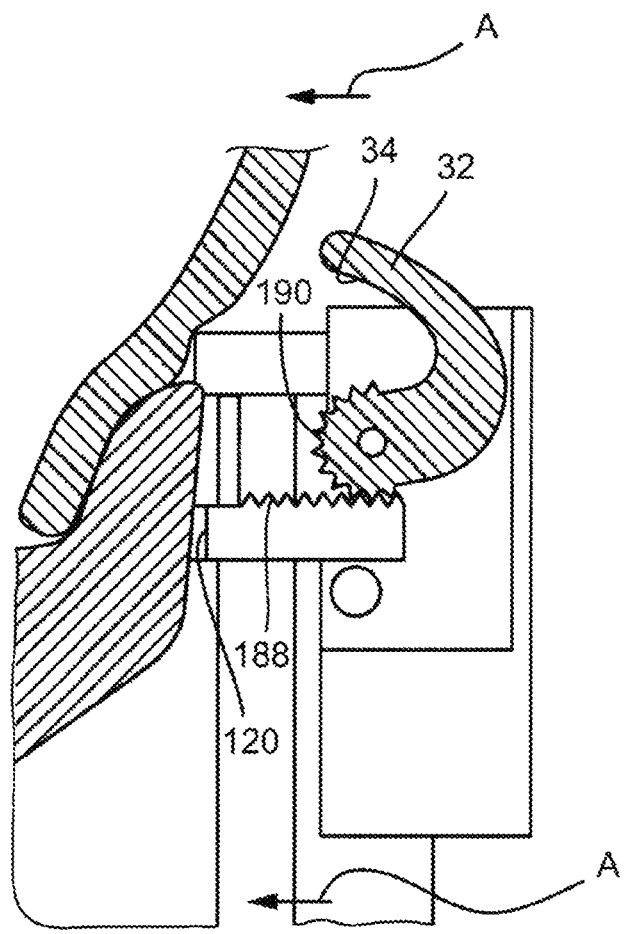
FIG. 24 includes FIG. 24A and FIG. 24B, and shows the clamping mechanism of the attachment of FIG. 22 in detail.
Figure 24B:
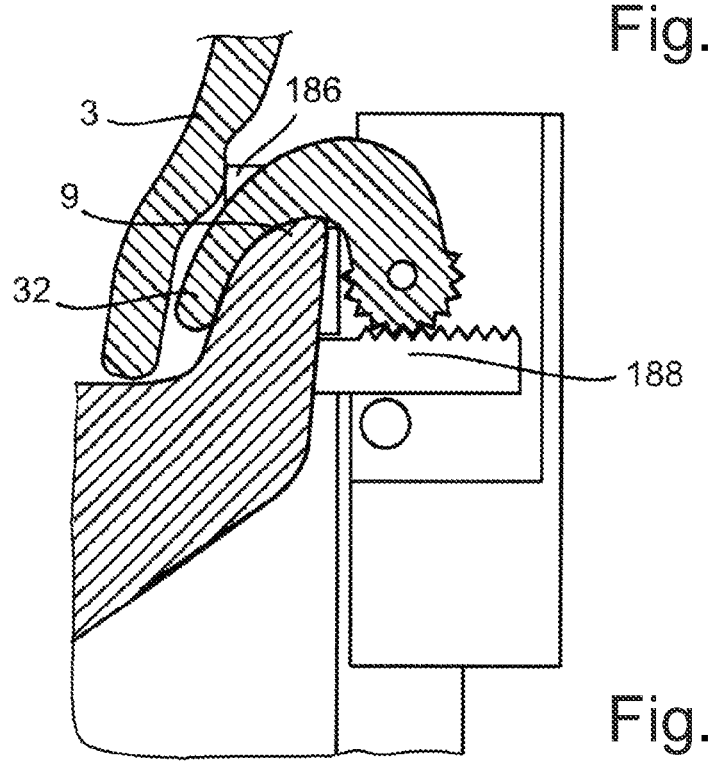

If the attachment 10 is attached to the vehicle wheel 1 via the fastening portion 50, the projections 186 of the tire displacement devices 184 contact the tire 3 in the region around the rim flange 9, as shown in FIG. 24 *a*). On attachment of the attachment 10, the attachment moves in the axial direction A towards the vehicle wheel 1. The tire displacement devices 184 thereby displace the tire 3 in the axial direction A away from the rim flange 9. At the same time, the contact portions 120 contact the wheel disk 2 and are thereby actuated. Via the actuation of the contact portions 120, the clamping means 32 are actuated. The contact portions 120 move in the axial direction A into the attachment 10 and in the present case their movement is coupled via the toothed rod portions 188 and the toothing systems 190 with a pivoting movement of the clamping means 32. The clamping means 32 pivot towards the rim 2A in such a manner that they come into engagement behind the rim flange 9. The state in which the attachment 10 is completely fastened to the vehicle wheel 1 is shown in FIG. 24*b*. The clamping means 32 are in engagement behind the rim flange 9, and the attachment 10 is securely fastened to the vehicle wheel 1. Coupling of the actuation of the contact portions 120 and the actuation of the clamping means 32 can also be implemented in a different way than via the coupling of the toothed rod portions 188 with the toothing systems 190. In particular, it is advantageous if the clamping mechanisms 122 of the clamping means 32 have a ratchet device 136.

Also in the case of the contact portions 120 which are configured and arranged to be actuated via contact with the wheel disk 2, it is conceivable that the clamping means 32 are associated with a clamping mechanism 122 which is so configured that the clamping means 32 is biased, in particular spring-biased, towards the portion of the rim 2A and held by a retaining element 166 which releases the clamping means 32 so that the clamping means 32 moves on account of the biasing towards the rim 2A, in particular the portion 10 of the rim 2A, in particular the hook portion 34 engages behind the portion of the rim 10, when the contact portion 120 is actuated, in particular subjected to pressure.

FIG. 25 shows an adapter 192 which can be fitted to a conventional wheel bolt 194 of a vehicle wheel 1. The adapter 192 represents a device 193 for gripping a conventional wheel bolt 194 by clamping. The bolt 194 of the vehicle wheel 1 has a head 196 with a hexagon head. The adapter 192 comprises a clamping cap 198 with six clamping arms 1100, which are configured and arranged according to the hexagon head of the head 196. The adapter 192 further comprises a clamping sleeve 1102 which, when it is pushed onto the clamping cap 198, biases the clamping arms 1100 towards one another in such a manner that the head 196 of the wheel bolt 194 is gripped by the clamping arms 1100. The adapter 192 additionally comprises a bolt 1104, with which the clamping sleeve 1102 can be clamped against the clamping cap 198. This clamped state is shown on the left in FIG. 25, while there is shown on the right a representation in which the individual components of the adapter 192 and the wheel bolt 194 are each shown separately from one another. The bolt 1104 has an external thread 1106. Via the bolt 1104 and the external thread 1106, an attachment 10 can be mounted on the vehicle wheel 1 using a screw nut. However, other forms of the bolt 1104 which allow an attachment 10 to be fastened are also conceivable. For example, the bolt 1104 can carry an internal thread or have bendable arms with hook portions, so that the attachment 10 can, as it were, be pushed over the arms and the arms can then hook behind the attachment 10. It is advantageous if the bolt 1104 is so configured that an attachment 10 can be attached to the vehicle wheel 1 in such a manner that it is held in a friction-based or form-fitting manner by means of the bolt 1104.

The clamping cap 198 has an internal thread 1108 into which a prolongation 1110 with an external thread 1112 of the bolt 1104 can be screwed, so that the clamping cap 198 is pulled into the clamping sleeve 1102, whereby the clamping arms 1100 are biased towards one another. The screw head 196 of the wheel bolt 194 can thereby be gripped in a friction-based manner.

Figure 26:
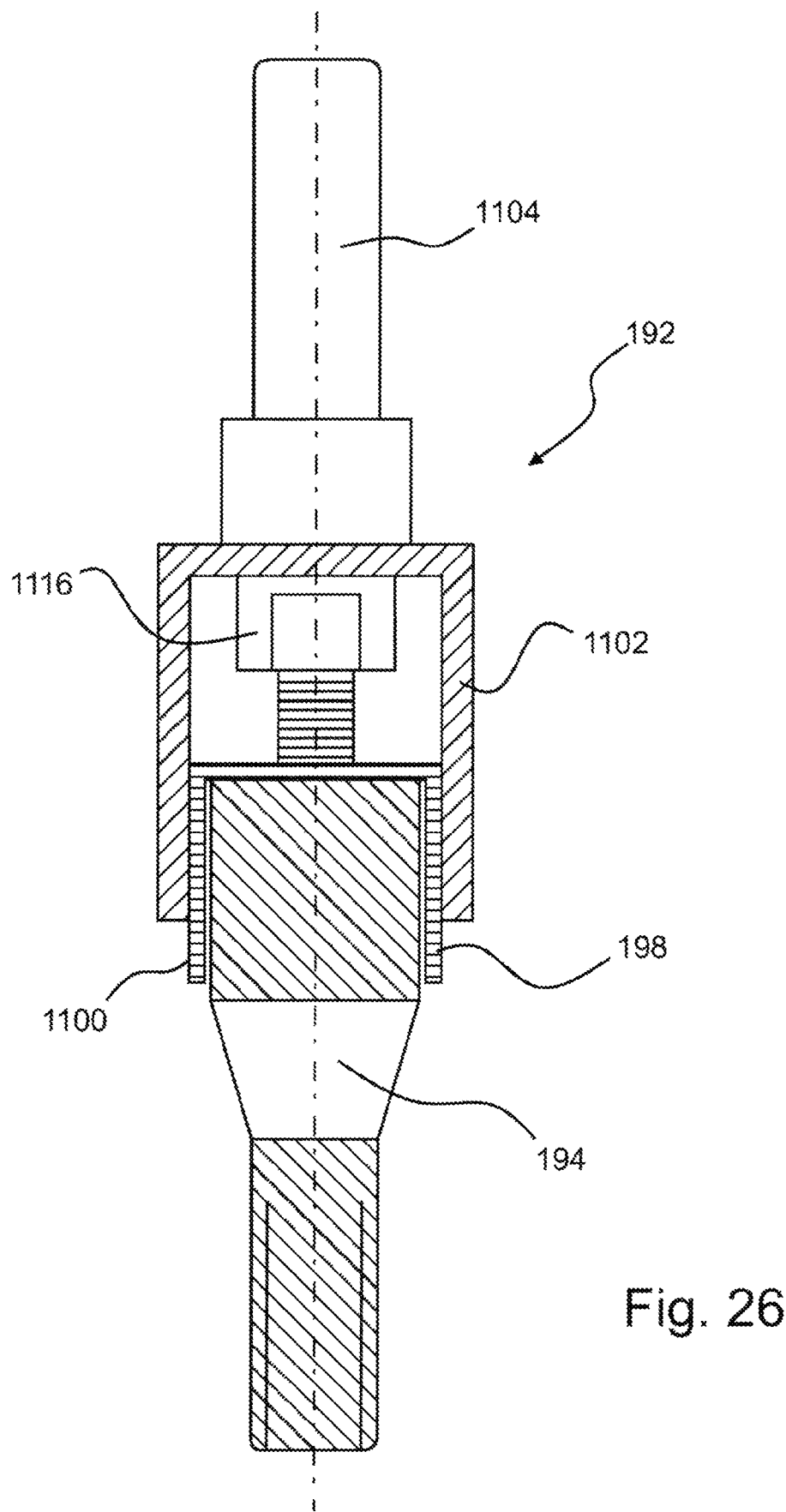
FIG. 26 shows an alternative embodiment of a device for gripping a conventional wheel bolt by clamping.

FIG. 26 shows an alternative embodiment of the adapter 192. This differs from the embodiment of FIG. 25 in that the clamping cap 198 comprises a prolongation 1110 with an external thread and the bolt 1104 comprises a prolongation 1116 with an internal thread.

The bolt 1104 can also comprise hook portions 1116 which are able to engage into corresponding recesses 1118 on specially adapted wheel bolts 194. Such hook portions 1116 are also conceivable in the region of the fastening portion 50 of the attachment 10, so that the attachment 10 can be attached by being clipped, as it were, onto the specially adapted wheel bolts 194.

Figures 27A, 27B:
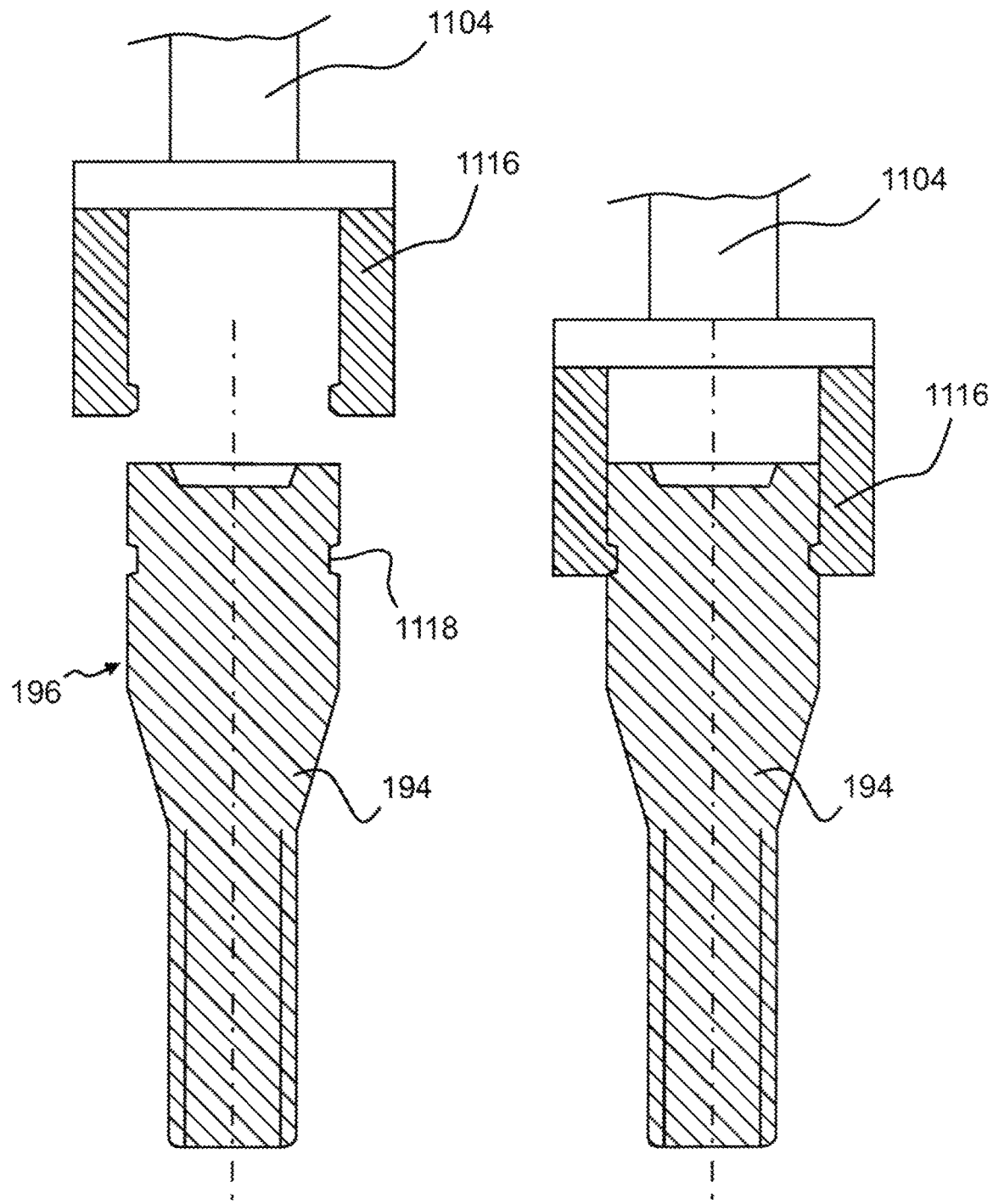
FIG. 27 includes FIG. 27A and FIG. 27B, and shows a device for gripping an adapted wheel bolt by engaging behind it.
Figure 28A:
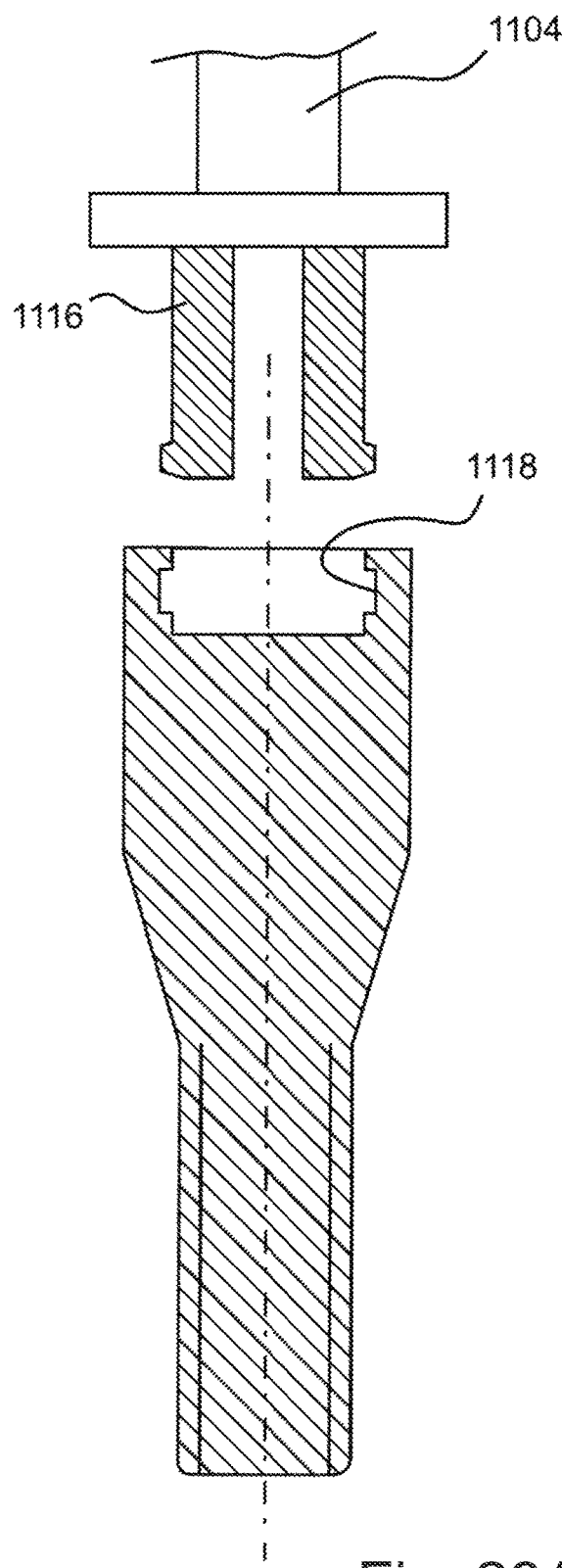
FIG. 28 includes FIG. 28A and FIG. 28B, and shows an alternative device for gripping an adapted wheel bolt by engaging behind it.
Figure 28B:
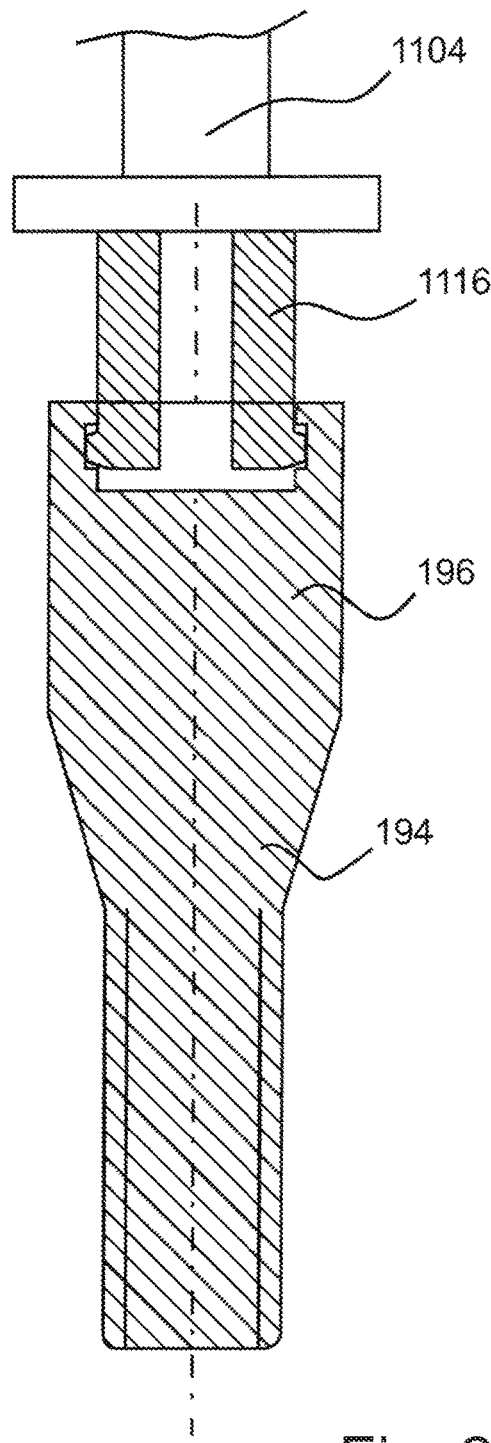

It is thereby conceivable that the recesses 1118, as shown in FIG. 27, are arranged on the outside of the screw head 196, or also, as shown in FIG. 28, are arranged on the inside. Such a form represents a device 193 for gripping an adapted wheel bolt 194 by engaging behind it.

Figure 29B:
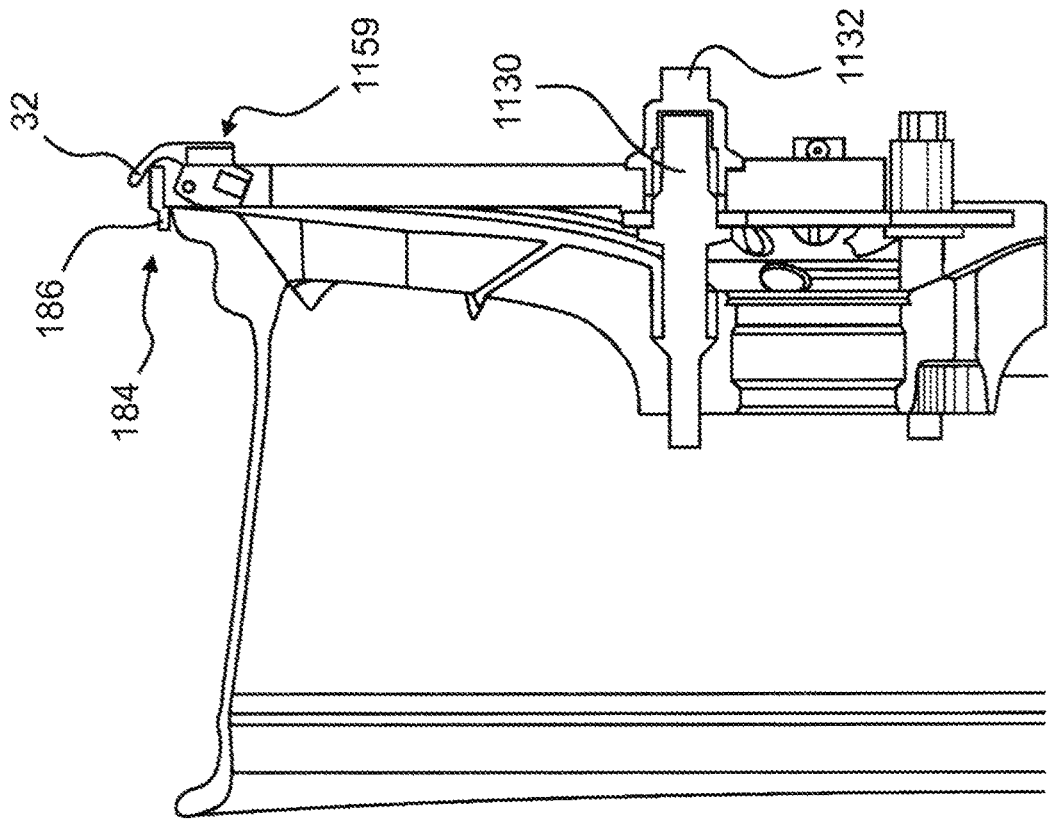
FIG. 29 includes FIG. 29A and FIG. 29B, and shows an attachment which has been attached to the vehicle wheel via special bolts.
Figure 29A:
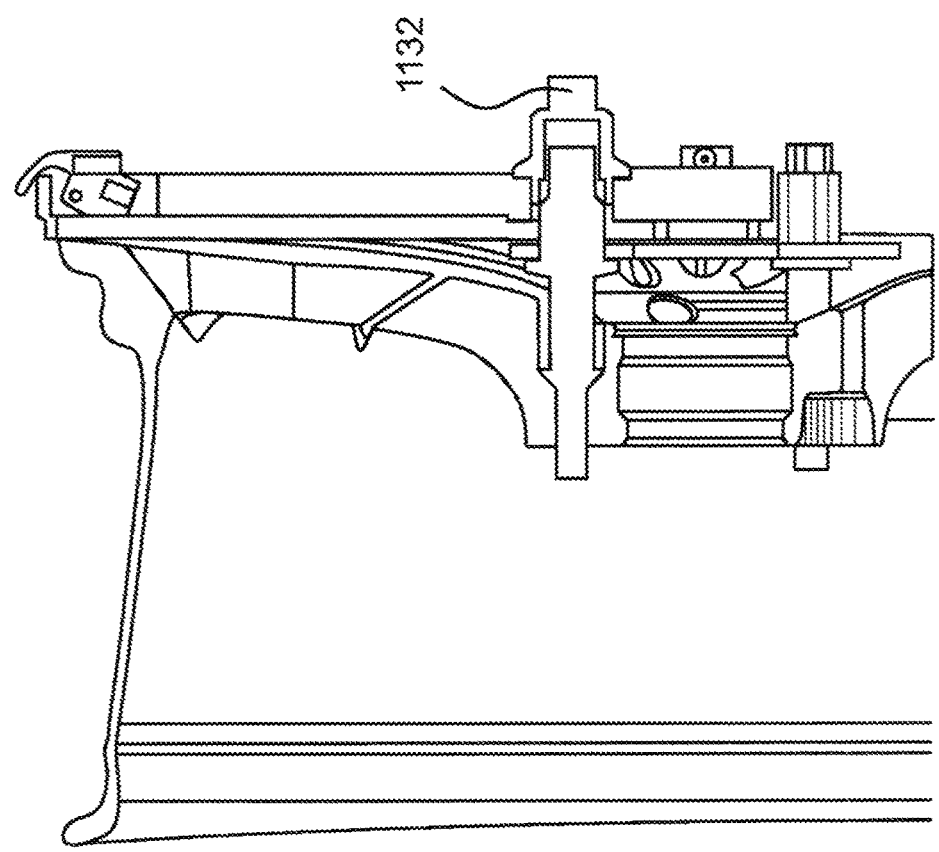

As shown in FIG. 29, it is also possible to attach the attachment 10 to the vehicle wheel 1 via special bolts 1130, wherein the special bolts 1130 are so configured that they replace a conventional wheel bolt 194 and are sufficiently long that the attachment 10 can be attached to the vehicle wheel 1 by means of corresponding nuts 1132. The clamping means 32 can then be configured, for example, to be actuatable separately.

Figure 30:
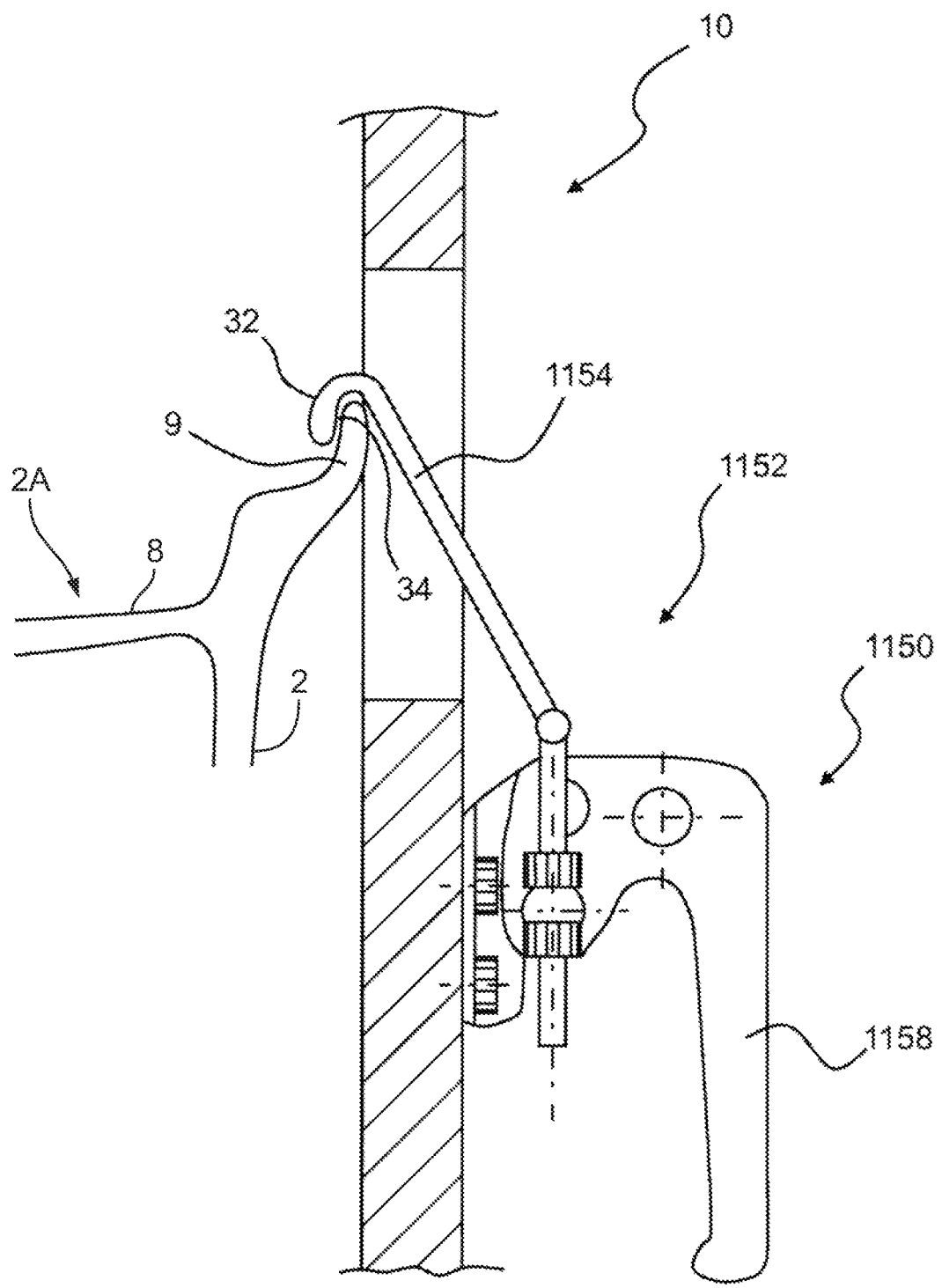
FIG. 30 shows an attachment having an actuating device for a clamping means.

FIG. 30 shows a further alternative embodiment of the attachment 10 in which, instead of the clamping mechanism 122 with the contact portion 120, an actuating device 1150 is provided for the respective clamping means 32, with which actuating device the clamping means 32 can be brought into engagement behind the portion 9 of the rim 2A, preferably the rim flange 9. The actuating device 1150 is in the form of a lever mechanism 1152, in the present case having a lever arm 1154, on which the clamping means 32 is arranged, which is operable, for example, manually via a handle 1158, which is part of the actuating device 1150.

It is also advantageous if the clamping means 32 comprises or comprise, instead of or in addition to the handle 1158, an application device 1159 (FIG. 29), via which a lever can be applied to the clamping means 32, so that the clamping means 32 is movable or pivotable via that lever onto the portion 9 of the rim 2A, preferably the rim flange 9. Such a lever can form the actuating device 1150 just mentioned.

Figure 31:
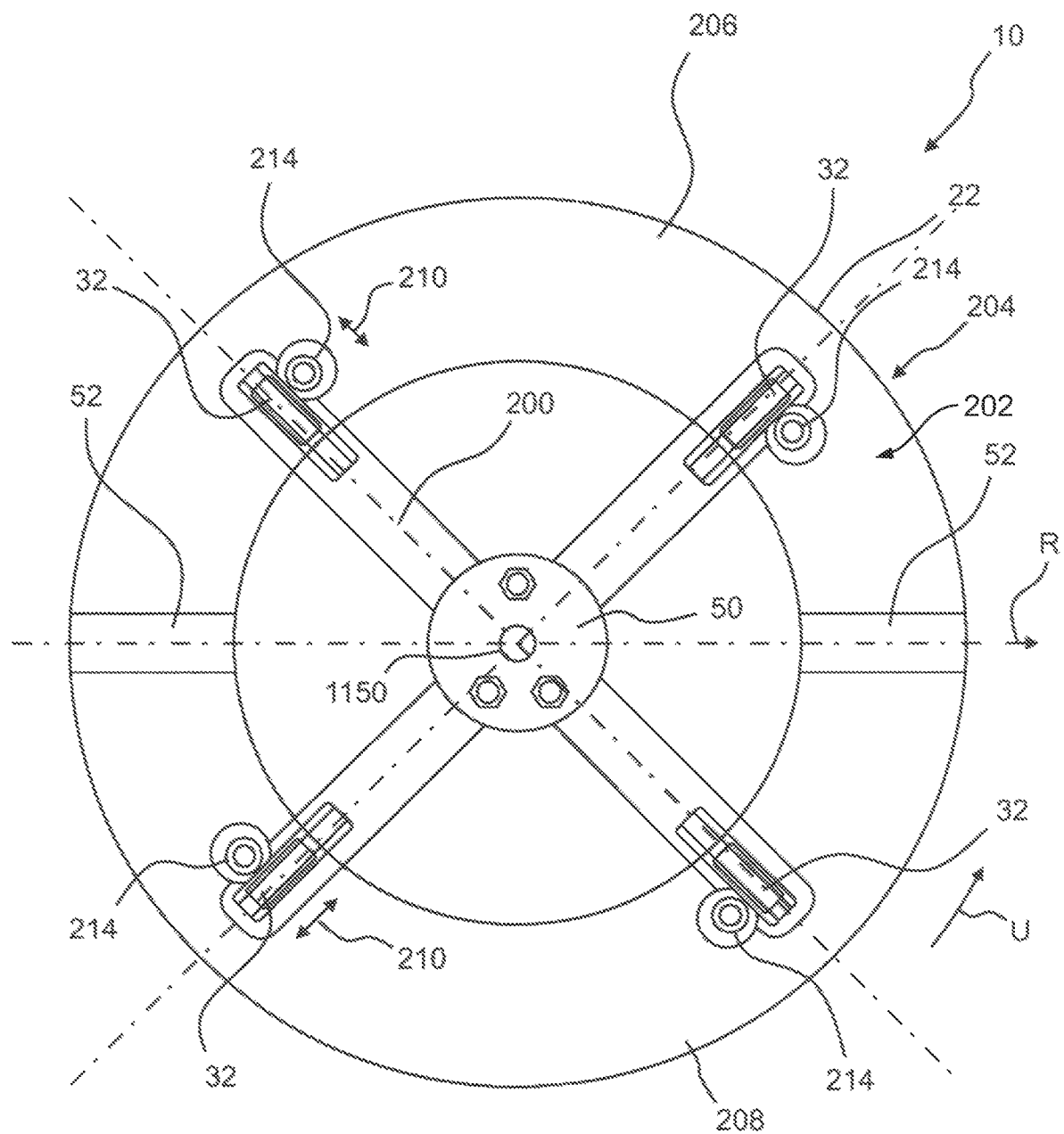
FIG. 31 shows an alternative embodiment of an attachment according to the invention.

FIGS. 31 and 32 show a further alternative embodiment of the attachment 10. The attachment 10 of FIGS. 31 and 32 comprises a base body 20, and wherein the base body 20 comprises a first radial element 200 and a second radial element 202, wherein the first radial element 200 is configured to be fastened to the vehicle wheel 1, and wherein the second radial element 202 is configured to be fastened to the first radial element 200 in an operating position. This operating position is shown in FIG. 31. The second radial element 202 extends in a part 204 of the periphery of the attachment 10 in the radial direction R beyond the first radial element 200, when it is fastened to the first radial element 200 in the operating position, in the embodiment shown in FIG. 31 the part 204 of the periphery comprises the whole of the periphery of the attachment. The attachment 10 of FIGS. 31 and 32 is thus, as it were, in multi-part form in the radial direction R. The attachment 10 has the advantage that the first radial element 200 can be fastened in a simple manner to the vehicle wheel 1, or to the rim 2A of the vehicle wheel 1, and in a further step the second radial element 202 can be fastened to the already fastened first radial element 200. The first radial element 200 is in the present case in the form of a cross.

The attachment 10 has a plurality of clamping means 32 on the first radial element 200. The clamping means are each configured with a hook portion 34 and arranged on the radially outer ends of the arms of the first radial element in cross form. The clamping means 32 are so arranged on the first radial element 200 that the first radial element can be fastened to the rim 2A centered via the clamping means. The hook portion 34 of the respective clamping means 32 is configured to engage behind a portion 9, in particular a rim flange 9, of the rim 2A of the vehicle wheel 1. The clamping means 32 can be configured as already described above in connection with the previous embodiments. Via the clamping means 32, the first radial element 200 can advantageously preferably be fastened to the rim flange 9.

As shown in FIGS. 32 c) and e), the clamping means 32 comprise clamping surfaces 40 which, when seen in the axial direction A, slope radially inwards, preferably in a linear or curved manner, wherein the clamping means 32 are so configured that the clamping surface 40 moves, in particular is displaced, radially inwards when the first radial element 200 is fastened and clamped to the rim 2A, and the clamping surface 40 is so configured that the first radial element 200 is urged in the axial direction A towards the wheel disk 2 when it is fastened and clamped to the rim 2A of the vehicle wheel 1. On fastening via the clamping means 32, the first radial element 200 is pulled by itself, as it were, in the axial direction in the direction of the vehicle wheel 1 as a result of the fastening via the clamping means 32.

The first radial element 200 is formed in one piece in the present case. However, it is also possible for the first radial element 200 to comprise a plurality of parts which are detachable from one another and/or movable, preferably pivotable, relative to one another.

In the present case, the second radial element 202 comprises a plurality of parts 206 and 208 which are detachable from one another and movable, namely pivotable, relative to one another. The parts 206 and 208 also form a first peripheral segment 16 and a second peripheral segment 18. The attachment 10, or the second radial element 202, can be disassembled or assembled in a compact manner, so that the attachment 10 is easily stowable. The two parts 206 and 208 detachably and pivotably connected to one another are connected together via detachable hinge devices 52.

An embodiment of the attachment 10 with a first and second radial element 200 and 202 can also be combined with a mounting element 26, for example a mounting element 26 as is shown in the exemplary embodiment according to FIGS. 3 and 4, as well as with all other variants of a mounting element 26 described in this application and optionally with further components associated with the mounting element 26.

The tread surface 22 of the attachment 10 is arranged wholly on the second radial element 202.

The clamping means 32 are arranged on the first radial element 200 to be displaceable in the radial direction R. The first radial element 200 can be adapted to different sizes of rims 1. The displaceability of the clamping means 32 is indicated by corresponding double-headed arrows at 210.

There is preferably provided on the first radial element 200 an actuating device 1150 via which the clamping means 32 can be so actuated that they engage behind the rim flange 9 of the rim 2A, in particular are displaced or pivoted radially inwards so that they engage behind the rim flange 9.

Figure 33B:
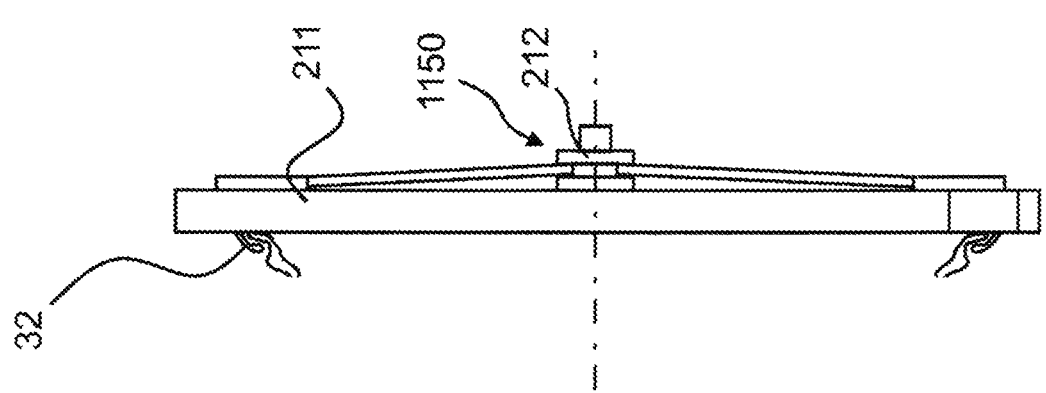
FIG. 33 includes FIG. 33A and FIG. 33B, and shows an alternative embodiment of the first radial element.
Figure 33A:
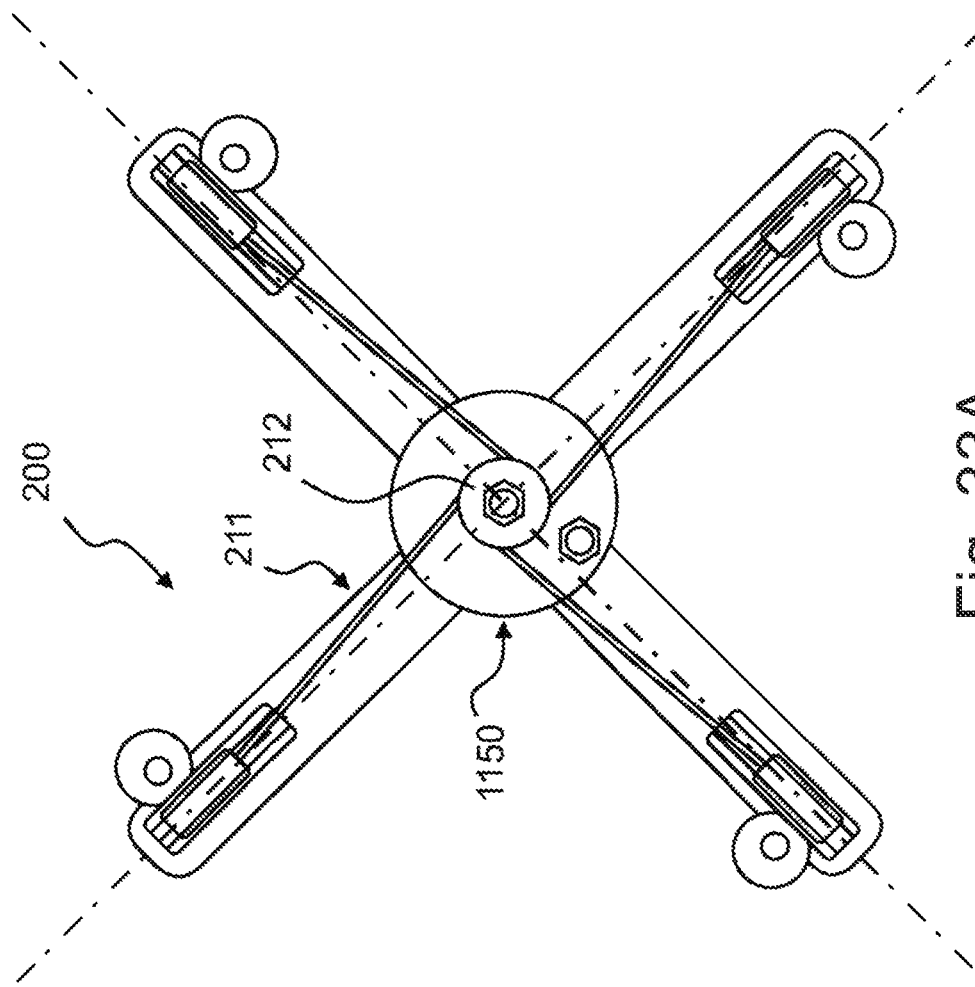
Figure 34D:
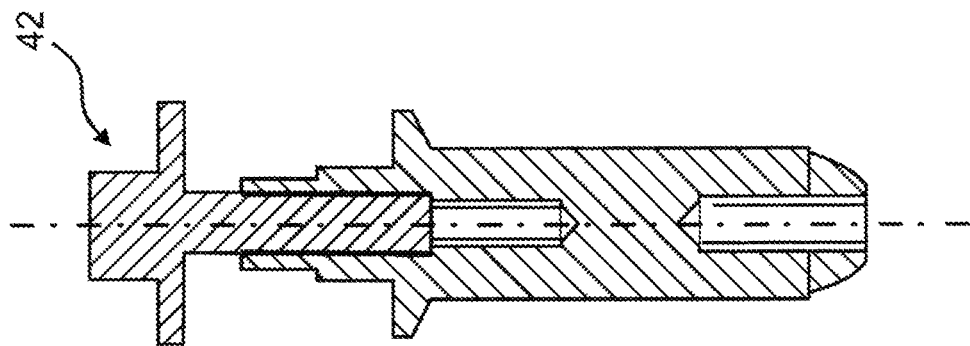
FIG. 34 includes FIGS. 34A through 34D, and shows a plurality of attachment fastening screws for use with stay bolts.
Figure 34C:
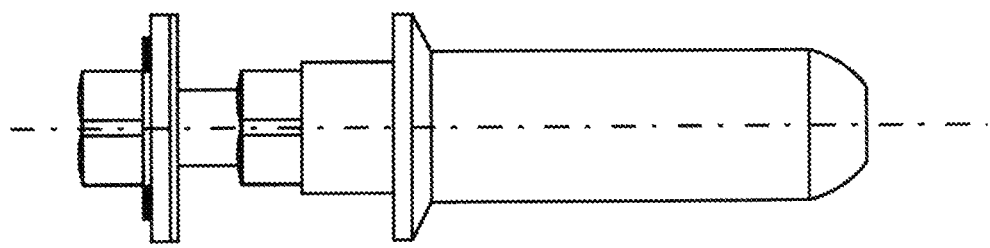
Figure 34B:
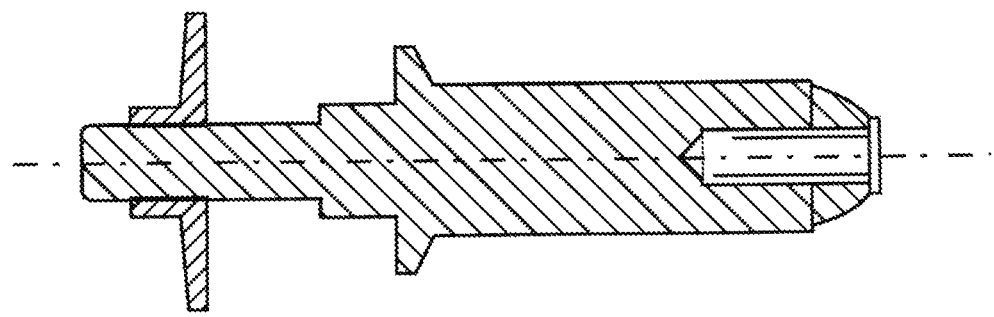
Figure 34A:
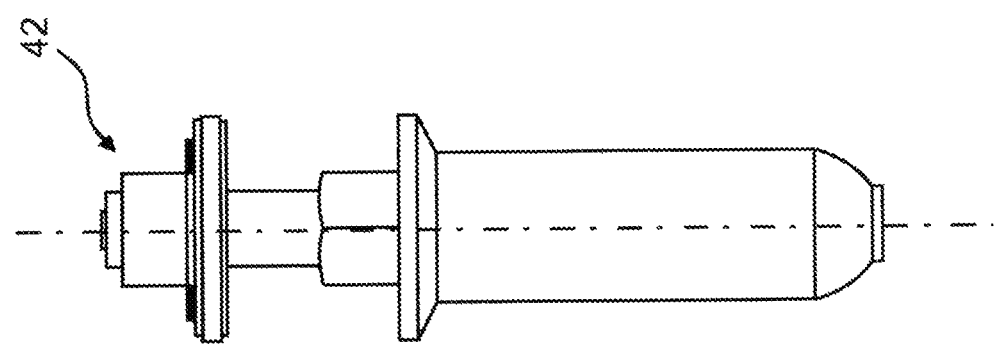
Figure 35D:
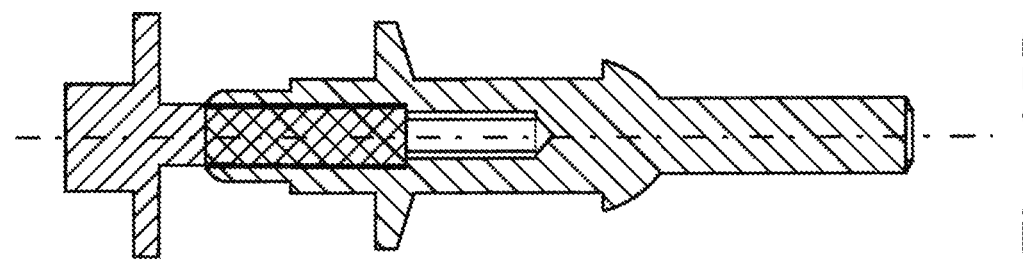
FIG. 35 includes FIGS. 35A through 35D, and shows a plurality of attachment fastening screws for replacing conventional wheel bolts.
Figure 35C:
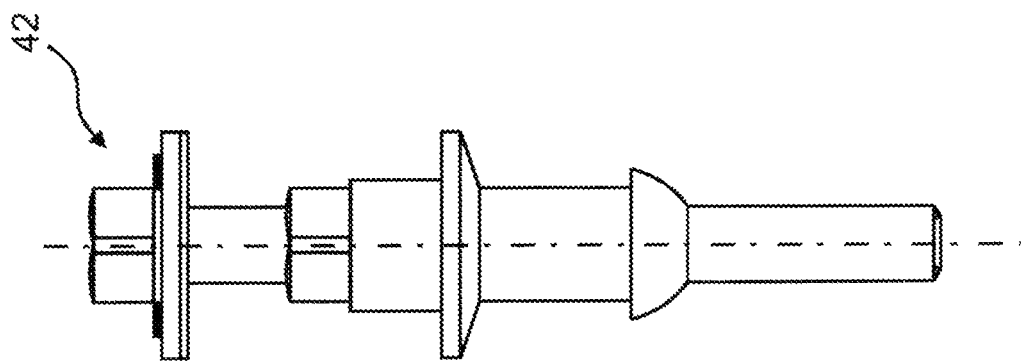
Figure 35B:
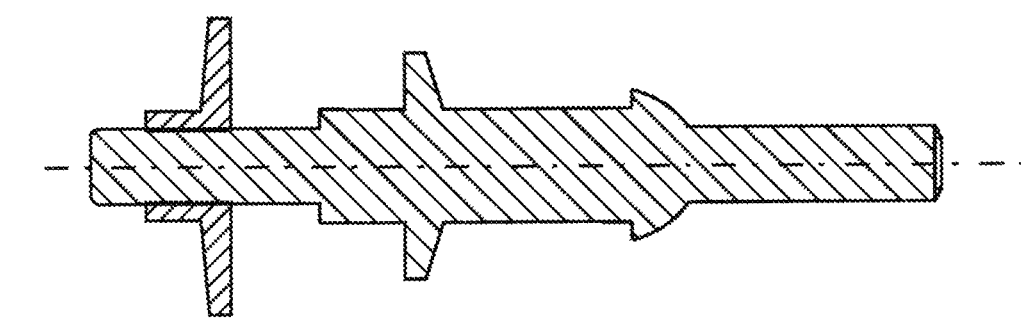
Figure 35A:
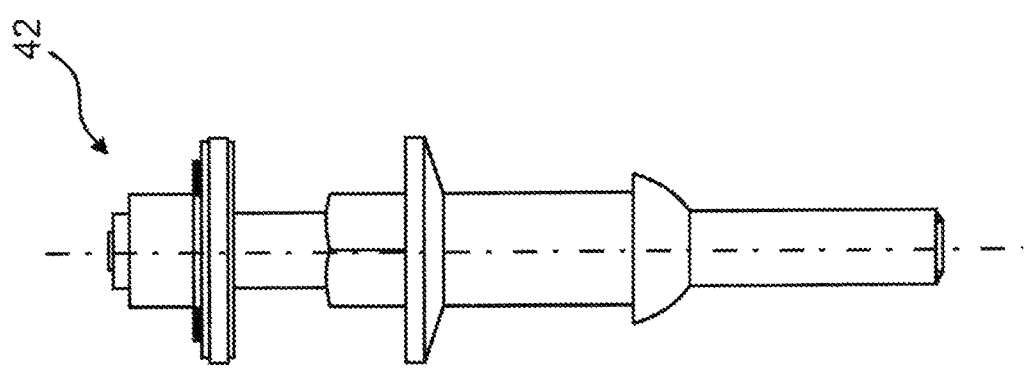

The actuating device 1150 advantageously comprises a cable-pull device 211 which preferably comprises a drum device 212 for winding the cable, wherein preferably all the clamping means 32 are coupled together via the cable-pull device 211 and the clamping means 32 are movable, preferably uniformly, by the cable-pull device 211. Such an embodiment of the first radial element 200 is shown in FIG. 33.

It is also preferred if the first radial element 200 can be fastened to the wheel disk 2 in the region of the bolt circle via a screw connection. This can be produced via a fastening portion 50. It is preferred if, in addition, the above-mentioned clamping means 32 are provided on the first radial element 200. Such a fastening can be produced via a screw connection (FIG. 32 *a*)) or via a connection having a plurality of screw connections (FIG. 32 *b*)).

The mounting of the attachment 10 which is in multi-part form in the radial direction will be outlined briefly hereinbelow. Firstly, the first radial element 200 is screwed on in the region of the bolt circle 4. For this purpose, one of the original wheel bolts, for example, can be replaced by one or more special screw(s). The clamping means 32 can then be brought into engagement behind the rim flange 9. It is also possible that the first radial element 200 is so configured that it is fastened to the rim flange 9 only by means of the clamping means 32. After the first radial element 200 has been fastened to the vehicle wheel 1, the second radial element 202 can be fastened to the first radial element 200. Preferably, the two radial elements 200, 202 have correspondingly configured fastening devices 214 or screw devices 214 for this purpose.

The first part 206 of the second radial element 202 is fastened to the first radial element on a side that is remote from the road surface. The vehicle wheel 1 is then so turned that the part 206 of the second radial element 202 already fastened to the first radial element 200 comes into contact with the road surface and then the further part 208 or the further parts of the second radial element 202 can be fastened to the first radial element 200 without the road surface being in the way.

FIGS. 34 and 35 each show special screws or attachment fastening screws 42 which can be used for mounting or fastening the attachment 10, in particular via the fastening portion 50. The embodiments of FIG. 34 *a*) and b) can be screwed onto stay bolts, which are used for fastening the vehicle wheel 1, after the corresponding wheel nuts have been removed. The embodiments of FIG. 35 *a*) and b), on the other hand, can be used instead of the conventional wheel bolts.

Figure 36:
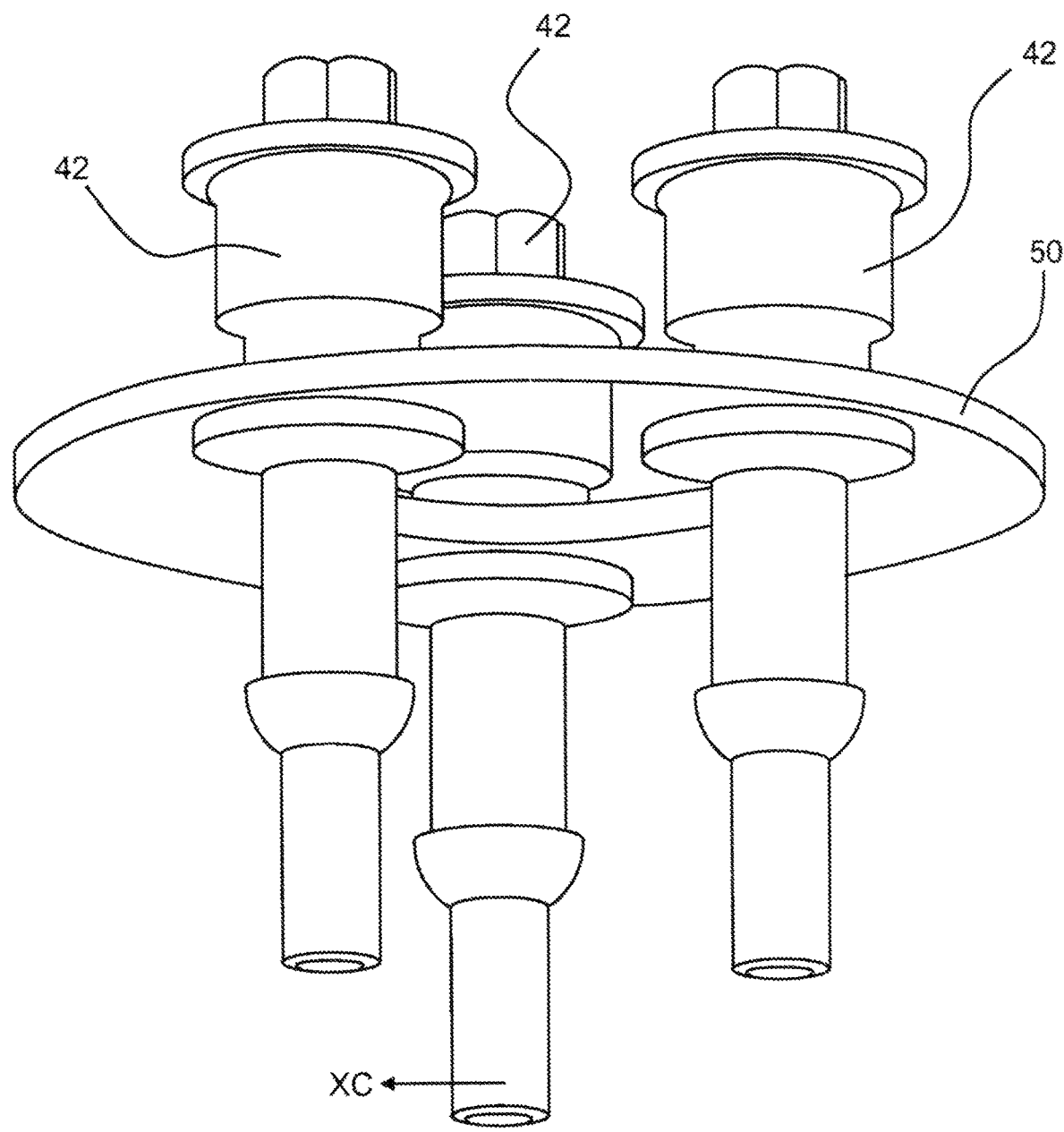
FIG. 36 shows a mounting element.

FIG. 36 shows a mounting element 26 which can be fastened to the vehicle wheel 1 in a mounting position on an attachment 10 by means of attachment fastening screws 42.

The invention claimed is:

1. An attachment for a vehicle wheel for enabling driving operation with limited tire function, the attachment comprising:
   a base body which in an operating state of the attachment has an annular tread surface, the base body has at least a first peripheral segment and a second peripheral segment, wherein the first peripheral segment is configured to be rigid in a peripheral direction along a periphery of the annular tread surface and is configured to be fastened to the vehicle wheel, and wherein the first peripheral segment has a fastening portion by which the first peripheral segment can be fastened in a region of or to a bolt circle of the vehicle wheel, and
   a mounting element fastened to at least one of the first peripheral segment and the vehicle wheel in such a manner, or is configured to be fastened thereto in such a manner, that the mounting element can be transferred into a mounting position or is in the mounting position, wherein the mounting element aligns the second peripheral segment relative to the first peripheral segment and urges the second peripheral segment towards a rim of the vehicle wheel when the first peripheral segment is fastened to the vehicle wheel and the mounting element is in the mounting position,
   wherein the mounting element comprises a hole pattern which corresponds to a portion of a hole pattern of the bolt circle of the vehicle wheel.

2. The attachment as claimed in claim 1, wherein the mounting element is pivotable or displaceable relative to the first peripheral segment.

3. The attachment as claimed in claim 1, wherein the mounting element is detachable from the first peripheral segment.

4. The attachment as claimed in claim 1, further comprising securing devices for the mounting element arranged on at least one of the first peripheral segment and the second peripheral segment to fix the position of the mounting element relative to the first peripheral segment or the second peripheral segment.

5. The attachment as claimed in claim 1, wherein the first peripheral segment comprises an arcuate portion having a peripheral extent of more than 180°, and wherein the fastening portion extends in the manner of a chord over the region of the bolt circle of the vehicle wheel.

6. The attachment as claimed in claim 1, wherein the mounting element is one of V-shaped, having two legs extending, in the mounting position, at least from the region of the bolt circle to the second peripheral segment, or in rod form extending, in the mounting position, at least from the region of the bolt circle to the second peripheral segment or from the first peripheral segment over the region of the bolt circle to the second peripheral segment.

7. The attachment as claimed in claim 1, wherein the mounting element is in circular-disk or annular form, and is configured to be fastened to the bolt circle of the vehicle wheel.

8. The attachment as claimed in claim 1, wherein the second peripheral segment is pivotably fastened to the first peripheral segment by at least one hinge device.

9. The attachment as claimed in claim 1, further comprising at least one clamping means having a hook portion arranged on at least one of the first peripheral segment and the second peripheral segment, wherein the hook portion is configured to engage behind a portion of the rim of the vehicle wheel in an operating state of the attachment.

10. The attachment as claimed in claim 9, wherein the at least one clamping means comprises a clamping surface which, when seen in an axial direction, slopes radially inwards, wherein the at least one clamping means is so configured that the clamping surface moves radially inwards when the attachment is fastened and clamped to the rim, and wherein the clamping surface is so configured that the attachment is urged in the axial direction towards the rim when fastened and clamped to the rim of the vehicle wheel.

11. The attachment as claimed in claim 9, wherein the attachment comprises a clamping mechanism having a contact portion configured to actuate the clamping means and bring the hook portion into engagement behind the portion of the rim when the contact portion is actuated.

12. The attachment as claimed in claim 11, wherein the clamping mechanism is configured to contact a road surface with the contact portion and thereby actuate the contact portion when the attachment is attached to the vehicle wheel and the vehicle wheel is turning, and wherein the contact portion is arranged in the tread surface of the attachment and wherein the contact portion, in a deployed state, extends in the peripheral direction flush with the tread surface of the attachment.

13. The attachment as claimed in claim 11, wherein the clamping mechanism is configured to contact the rim with the contact portion when the attachment is attached to the vehicle wheel and thereby actuate the contact portion, and wherein the contact portion is arranged on a side of the attachment that faces the rim.

14. The attachment as claimed in claim 11, wherein the clamping mechanism comprises a ratchet device configured to allow the contact portion to move freely when the hook portion is in engagement behind the portion of the rim.

15. The attachment as claimed in claim 11, wherein the clamping means is coupled with the clamping mechanism by a pressure limiting device, and wherein the pressure limiting device is configured to limit a pressure with which the clamping means is urged towards, or contacts, the rim to a limit pressure.

16. The attachment as claimed in claim 11, wherein the clamping mechanism comprises a holding mechanism configured to hold the clamping means in position when the clamping means is in engagement with the hook portion behind the portion of the rim.

17. The attachment as claimed in claim 1, wherein the attachment comprises an engagement element configured to fasten at least one of the fastening portion and the mounting element to a center opening of the bolt circle directly or indirectly, and wherein the engagement element comprises an engagement portion configured to engage in a form-fitting manner behind a portion of the center opening, and wherein the engagement portion is mechanically expandable or resiliently pivotable.

18. The attachment as claimed in claim 1, wherein the fastening portion comprises a device for gripping a wheel bolt by at least one of clamping and engaging behind the wheel bolt, wherein the device comprises a clamping cap having at least two clamping arms and comprises a clamping sleeve which, when pushed onto the clamping cap, biases the clamping arms towards one another in such a manner that a head of the wheel bolt can be gripped by the clamping arms, and wherein the device further comprises a bolt with which the clamping sleeve can be clamped against the clamping cap.

19. An attachment for a vehicle wheel for enabling driving operation with limited tire function, the attachment comprising:

a base body including a first radial element and a second radial element detachable from the first radial element, and a mounting element configured to be fastened to at least one of the vehicle wheel and the first radial element, wherein the first radial element has a fastening portion configured to be fastened to the vehicle wheel in a region of or to a bolt circle of the vehicle wheel, and wherein the second radial element is configured to be fastened to the first radial element in an operating position, and wherein the second radial element extends beyond the first radial element in a radial direction in a portion of a periphery of the attachment when fastened to the first radial element in the operating position, and wherein the portion of the periphery comprises at least ⅛ of the entire periphery of the attachment, and wherein the mounting element comprises a hole pattern which corresponds to a portion of a hole pattern of the bolt circle of the vehicle wheel.

20. The attachment as claimed in claim 19, further comprising at least one clamping means arranged on the first radial element, the at least one clamping means having a hook portion configured to engage behind a portion of a rim of the vehicle wheel.

21. The attachment as claimed in claim 20, wherein the at least one clamping means comprises a clamping surface which, when seen in an axial direction, slopes radially inwards, and wherein the at least one clamping means is so configured that the clamping surface moves radially inwards when the first radial element is fastened and clamped to the rim, and wherein the clamping surface is so configured that the attachment is urged in the axial direction towards the rim when fastened and clamped to the rim of the vehicle wheel.

22. The attachment as claimed in claim 19, wherein at least one of the first radial element and the second radial element comprises a plurality of parts at least one of detachable from one another and movable relative to one another.

23. The attachment as claimed in claim 19, wherein the second radial element comprises a totality of a tread surface of the attachment for contacting a road surface.

24. The attachment as claims in claim 1, wherein the fastening portion comprises another hole pattern which corresponds to the portion of a hole pattern of the bolt circle of the vehicle wheel.

* * * * *